(12) United States Patent
Kawaguchi et al.

(10) Patent No.: US 12,124,212 B2
(45) Date of Patent: Oct. 22, 2024

(54) TONER

(71) Applicant: CANON KABUSHIKI KAISHA, Tokyo (JP)

(72) Inventors: Shintaro Kawaguchi, Kanagawa (JP); Masatake Tanaka, Kanagawa (JP); Tatsuya Saeki, Shizuoka (JP); Masamichi Sato, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 389 days.

(21) Appl. No.: 17/329,740

(22) Filed: May 25, 2021

(65) Prior Publication Data

US 2021/0373450 A1    Dec. 2, 2021

(30) Foreign Application Priority Data

Jun. 1, 2020 (JP) ................. 2020-095423

(51) Int. Cl.
  *G03G 9/093* (2006.01)
  *C08G 63/183* (2006.01)
  *G03G 9/08* (2006.01)

(52) U.S. Cl.
  CPC ....... *G03G 9/09328* (2013.01); *C08G 63/183* (2013.01); *G03G 9/0819* (2013.01); *G03G 9/09335* (2013.01); *G03G 9/09342* (2013.01); *G03G 9/09371* (2013.01)

(58) Field of Classification Search
  CPC ............ G03G 9/09328; G03G 9/0819; G03G 9/09335; G03G 9/09342; G03G 9/09371
  See application file for complete search history.

(56) References Cited

U.S. PATENT DOCUMENTS

| | | |
|---|---|---|
| 7,833,685 B2 | 11/2010 | Tanaka et al. |
| 8,377,616 B2 | 2/2013 | Tani et al. |
| 8,628,899 B2 | 1/2014 | Kawamura et al. |
| 8,815,484 B2 | 8/2014 | Tanaka et al. |
| 9,158,216 B2 | 10/2015 | Shimano et al. |
| 9,377,705 B2 | 6/2016 | Shimano et al. |

(Continued)

FOREIGN PATENT DOCUMENTS

| | | |
|---|---|---|
| JP | 3-89361 A | 4/1991 |
| JP | 9-179341 A | 7/1997 |

(Continued)

*Primary Examiner* — Peter L Vajda
*Assistant Examiner* — Boone Alexander Evans
(74) *Attorney, Agent, or Firm* — VENABLE LLP

(57) ABSTRACT

A toner comprising a toner particle that comprises a core particle comprising a binder resin and a surface layer comprising inorganic fine particles and an organosilicon polymer, wherein the organosilicon polymer has T3 structure represented by $R\text{—}Si(O_{1/2})_3$, in $^{29}Si$-NMR measurement of THF insoluble-matter of the toner particle, a proportion of a peak area assigned to the T3 structure relative to a total peak area for the organosilicon polymer is at least 5.0%, and in observation of a cross section of the toner particle using TEM, the toner has a prescribed surface layer thickness, a prescribed number of inorganic fine particles in contact with the core particle in the surface layer, and a prescribed number of inorganic fine particles present in the core particle and not in contact with the surface layer.

6 Claims, 3 Drawing Sheets

(56) References Cited

U.S. PATENT DOCUMENTS

| | | | |
|---|---|---|---|
| 9,383,668 B2 | 7/2016 | Noji et al. |
| 9,423,714 B2 | 8/2016 | Kenmoku et al. |
| 9,500,972 B2 | 11/2016 | Tanaka et al. |
| 9,575,424 B2 | 2/2017 | Nakagawa et al. |
| 9,599,919 B2 | 3/2017 | Isono et al. |
| 9,658,549 B2 | 5/2017 | Tanaka et al. |
| 9,785,071 B2 | 10/2017 | Shimano et al. |
| 9,829,816 B2 | 11/2017 | Tanaka et al. |
| 9,835,964 B2 | 12/2017 | Yoshida et al. |
| 9,904,193 B2 | 2/2018 | Nakagawa et al. |
| 9,958,801 B2 | 5/2018 | Tanaka et al. |
| 10,054,866 B2 | 8/2018 | Tanaka et al. |
| 10,241,430 B2 | 3/2019 | Kimura et al. |
| 10,289,016 B2 | 5/2019 | Fukudome et al. |
| 10,295,921 B2 | 5/2019 | Ohmori et al. |
| 10,678,155 B2 | 6/2020 | Terui et al. |
| 10,747,133 B2 | 8/2020 | Yagi et al. |
| 10,747,134 B2 | 8/2020 | Watanabe et al. |
| 10,768,540 B2 | 9/2020 | Watanabe et al. |
| 10,809,639 B2 | 10/2020 | Yamawaki et al. |
| 10,845,721 B2 | 11/2020 | Tanaka et al. |
| 10,942,465 B2 | 3/2021 | Kototani et al. |
| 10,942,466 B2 | 3/2021 | Tominaga et al. |
| 10,969,704 B2 | 4/2021 | Kagawa et al. |
| 10,976,679 B2 | 4/2021 | Tanaka et al. |
| 11,003,104 B2 | 5/2021 | Katsura et al. |
| 11,003,105 B2 | 5/2021 | Sato et al. |
| 2010/0035171 A1 | 2/2010 | Watanabe et al. |
| 2014/0356779 A1 | 12/2014 | Hasegawa et al. |
| 2015/0099220 A1 | 4/2015 | Abe et al. |
| 2015/0248072 A1 | 9/2015 | Katsuta et al. |
| 2015/0286157 A1* | 10/2015 | Masumoto | G03G 9/0806 430/108.4 |
| 2016/0299447 A1* | 10/2016 | Masumoto | G03G 9/0819 |
| 2019/0384195 A1 | 12/2019 | Saeki et al. |
| 2020/0209776 A1 | 7/2020 | Kototani et al. |
| 2020/0285164 A1 | 9/2020 | Akiyama et al. |
| 2020/0292953 A1 | 9/2020 | Nakayama et al. |
| 2020/0292956 A1 | 9/2020 | Amano et al. |
| 2021/0003932 A1 | 1/2021 | Tsuda et al. |
| 2021/0223731 A1 | 7/2021 | Suzuki et al. |

FOREIGN PATENT DOCUMENTS

| | | |
|---|---|---|
| JP | 2015-96949 A | 5/2015 |
| JP | 2016-200814 A | 12/2016 |
| JP | 2017-122879 A | 7/2017 |
| JP | 2018-60010 A | 4/2018 |
| JP | 2020-16673 A | 1/2020 |

* cited by examiner

TONER

BACKGROUND OF THE INVENTION

Field of the Invention

The present disclosure relates to a toner used in image-forming methods, e.g., an electrophotographic method.

Description of the Related Art

In recent years, ever greater demands for higher speed, extended service life, greater energy conservation, and smaller size have been imposed on electrophotographic image-forming devices, and in response to these demands further improvements in various properties are also being required of a toner. In the areas of higher speed and extended service life, the toner in the developing device tends to be subjected to an increased exposure to stresses such as heat and impact. As a consequence, in order to maintain favorable image quality regardless of the use environment even during multisheet image output, a high-durability toner that can maintain charging performance and durability at high levels is required.

In the area of greater energy conservation, on the other hand, a toner that exhibits superior low-temperature fixability is required, although this frequently involves a trade off with high durability. As a consequence, there is even greater demand for a toner that is capable of exhibiting both high durability and low-temperature fixability at high levels.

One means for solving this problem is the method of coating the surface of a toner particle with a resin.

Japanese Patent Application Laid-open No. H03-089361 describes, as a method for coating a toner particle surface with a silicon compound, a method for producing a polymerized toner in which a silsane coupling agent is added to the reaction system.

Japanese Patent Application Laid-open No. H09-179341 describes a polymerized toner having on the surface thereof a coating film of a reaction product from a radical-polymerizable organosilane compound.

SUMMARY OF THE INVENTION

According to the results of study by the present inventors, the amount of silane compound deposition on the toner surface is inadequate in the case of the toner described in Japanese Patent Application Laid-open No. H03-089361 and there is room for improvement with regard to the coexistence of low-temperature fixability and high durability required by higher speeds and extended service life. In the case of the toner described in Japanese Patent Application Laid-open No. H09-179341, the organofunctional groups have a high polarity and the amount of silane compound deposition on the toner particle surface is inadequate, and hydrolysis and condensation polymerization of the silane compound is inadequate, and moreover the degree of cross-linking is weak. As a consequence, this is inadequate for the low-temperature fixability and high durability associated with higher speeds and extended service life, and there is room for improvement.

The present disclosure provides a toner that exhibits low-temperature fixability and high durability even at higher speeds and extended service life for an image-forming device.

As a result of intensive study to solve the aforementioned problem, the present inventors have found that the problem can be solved by the toner described herebelow.

The present disclosure relates to a toner comprising a toner particle that comprises
- a core particle comprising a binder resin, and
- a surface layer comprising inorganic fine particles and an organosilicon polymer, wherein
the organosilicon polymer has a structure given by formula (T3) below:

$$R\text{—}Si(O_{1/2})_3 \qquad (T3)$$

wherein, R represents an alkyl group having 1 to 6 carbons or a phenyl group;

in $^{29}$Si-NMR measurement of tetrahydrofuran insoluble-matter of the toner particle, a proportion of a peak area assigned to the structure given by the formula (T3) relative to a total peak area for the organosilicon polymer is at least 5.0%; and in observation of a cross section of the toner particle using a transmission electron microscope, with a long axis L being a chord that passes through the geometric center of the toner particle and provides the longest diameter in the toner particle cross section, with a line segment a being one of line segments provided by dividing the long axis L at a midpoint thereof, with An (n=1 to 32), respectively, being 32 line segments provided, using the line segment a as a point of reference, by drawing a line segment from the midpoint of the long axis L to a surface of the toner particle, the line segments each being shifted by 11.25°, with RAn (n=1 to 32) being a length of each of the line segments, and with FRAn (n=1 to 32) being a thickness of the surface layer on the An (n=1 to 32), in a cross section of a toner particle for which Dtem, defined in accordance with formula (1) below, is in a range of a toner particle weight-average particle diameter±10%, (i) an average thickness Dav. of the surface layer is 5.0 to 100.0 nm, (ii) the proportion of An line segments, for which the FRAn is not more than 5.0 nm, is not more than 20.0%, (iii) the number of inorganic fine particles in contact with the core particle in the surface layer is 16 to 30 per one toner particle, and (iv) in 100 toner particles, for which the Dtem is in a range of the toner particle weight-average particle diameter±10%, the proportion of toner particles comprising at least one inorganic fine particle present in the core particle and not in contact with the surface layer is not more than 10%:

$$Dtem=(RA1+RA2+RA3+RA4+RA5+RA6+RA7+RA8+\\RA9+RA10+RA11+RA12+RA13+RA14+RA15+\\RA16+RA17+RA18+RA19+RA20+RA21+RA22+\\RA23+RA24+RA25+RA26+RA27+RA28+RA29+\\RA30+RA31+RA32)/16 \qquad (1).$$

The present disclosure can thus provide a toner that exhibits a stable charging performance and high durability even at higher speeds and extended service life for the image-forming device.

Further features of the present invention will become apparent from the following description of exemplary embodiments with reference to the attached drawings.

DESCRIPTION OF THE EMBODIMENTS

Figure 1:
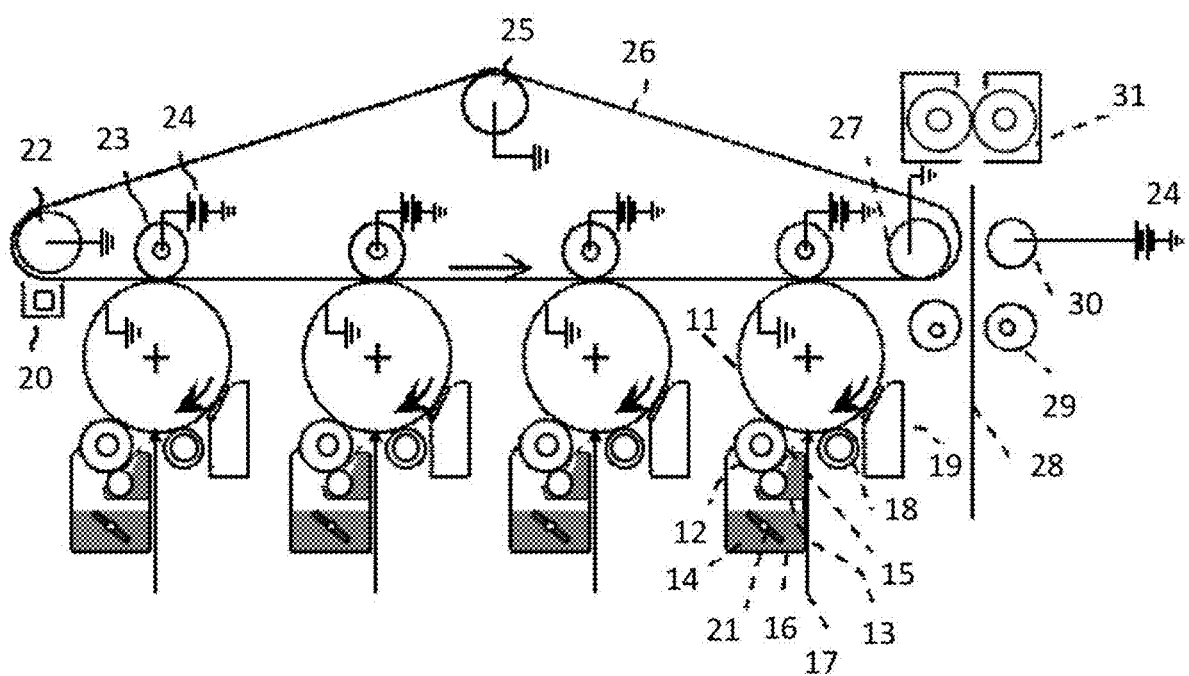
FIG. 1 is an example of a schematic structural diagram of an image-forming device.

The present disclosure is described in detail in the following. The reference signs using in the figures are defined as follows.

11 photosensitive member, 12 developing roller, 13 toner feed roller, 14 toner, 15 regulating blade, 16 developing apparatus, 17 laser light, 18 charging apparatus, 19 cleaning apparatus, 20 charging apparatus for cleaning, 21 stirring blade, 22 driver roller, 23 transfer roller, 24 bias power source, 25 tension roller, 26 transfer transport belt, 27 driven roller, 28 paper, 29 paper feed roller, 30 adsorption roller, 31 fixing apparatus The present disclosure relates to a toner comprising a toner particle that comprises a core particle comprising a binder resin, and a surface layer comprising inorganic fine particles and an organosilicon polymer, wherein the organosilicon polymer has a structure given by formula (T3) below:

$$R-Si(O_{1/2})_3 \quad (T3)$$

wherein, R represents an alkyl group having 1 to 6 carbons or a phenyl group;

in $^{29}$Si-NMR measurement of tetrahydrofuran insoluble-matter of the toner particle, a proportion of a peak area assigned to the structure given by the formula (T3) relative to a total peak area for the organosilicon polymer is at least 5.0%; and in observation of a cross section of the toner particle using a transmission electron microscope, with a long axis L being a chord that passes through the geometric center of the toner particle and provides the longest diameter in the toner particle cross section, with a line segment a being one of line segments provided by dividing the long axis L at a midpoint thereof, with Arn (n=1 to 32), respectively, being 32 line segments provided, using the line segment a as a point of reference, by drawing a line segment from the midpoint of the long axis L to a surface of the toner particle, the line segments each being shifted by 11.25°, with RAn (n=1 to 32) being a length of each of the line segments, and with FRAn (n=1 to 32) being a thickness of the surface layer on the Arn (n=1 to 32), in a cross section of a toner particle for which Dtem, defined in accordance with formula (1) below, is in a range of a toner particle weight-average particle diameter±10%, (i) an average thickness Dav. of the surface layer is 5.0 to 100.0 nm, (ii) the proportion of Arn line segments, for which the FRAn is not more than 5.0 nm, is not more than 20.0%, (iii) the number of inorganic fine particles in contact with the core particle in the surface layer is 16 to 30 per one toner particle, and (iv) in 100 toner particles, for which the Dtem is in a range of the toner particle weight-average particle diameter±10%, the proportion of toner particles comprising at least one inorganic fine particle present in the core particle and not in contact with the surface layer is not more than 10%:

$$\begin{aligned}Dtem=(&RA1+RA2+RA3+RA4+RA5+RA6+RA7+RA8+\\&RA9+RA10+RA11+RA12+RA13+RA14+RA15+\\&RA16+RA17+RA18+RA19+RA20+RA21+RA22+\\&RA23+RA24+RA25+RA26+RA27+RA28+RA29+\\&RA30+RA31+RA32)/16\end{aligned} \quad (1).$$

The present inventors think the following with regard to the reasons that the effects of the present disclosure are obtained when the indicated conditions are satisfied.

The toner particle has a surface layer that contains inorganic fine particles and an organosilicon polymer, and the organosilicon polymer has the structure given by R—SiO$_{3/2}$ (formula (T3)).

The R in the formula represents an alkyl group having from 1 to 6 carbons (preferably from 1 to 4 carbons and more preferably 1 or 2 carbons) or a phenyl group.

In the structure given by formula (T3), one of the four valences of the silicon atom is bonded to the organic group represented by R and the remaining three are bonded to oxygen atoms. The oxygen atoms reside in a state in which both of their two valences are bonded to a silicon atom, i.e., a siloxane bond (Si—O—Si). When considering the silicon atoms and oxygen atoms in the form of an organosilicon polymer, this is represented with —SiO$_{3/2}$ since three oxygen atoms are present for two silicon atoms. That is, the structure represented by formula (T3) is a structure as given by the following formula.

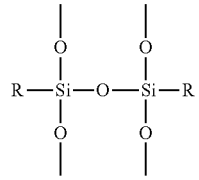

This —SiO$_{3/2}$ structure is similar to silica (SiO$_2$), which is composed of a large number of siloxane structures, and, because it has a hardness similar to that of silica, the present inventors believe that a high durability can be achieved by the incorporation of the —SiO$_{3/2}$ structure into the organosilicon polymer in the surface layer of the toner particle.

In addition, in $^{29}$Si-NMR measurement of the tetrahydrofuran insoluble-matter of the toner particle (also referred to in the following as the THF-insoluble matter), the proportion of the peak area assigned to the structure given by formula (T3) relative to the total peak area for the organosilicon polymer is at least 5.0%. While the details of the measurement method are given below, this approximately means that the proportion for the silicon atoms that participate in the structure given by R—SiO$_{3/2}$ in the organosilicon polymer incorporated in the surface layer of the toner particle is at least 5.0% of the total silicon atoms in the organosilicon polymer.

As noted above, the meaning of the structure given by R—SiO$_{3/2}$ is that, of the four valences of the silicon atom, three are bonded to oxygen atoms and these oxygen atoms are bonded to different silicon atoms. When one of these oxygen atoms constitutes a silanol group, this structure is then represented by R—SiO$_{2/2}$—OH. This structure resembles the disubstituted silicone resins represented by dimethylsilicone.

Due to this, it is thought that, as more of the structure given by R—SiO$_{3/2}$ is present, the surface layer of the toner particle, as indicated above, begins to exhibit a hardness quality like that of silica and a high durability can be exhibited. When, on the other hand, there is little of the R—SiO$_{3/2}$ structure, for example, as the structure represented by R—SiO$_{2/2}$—OH increases, the organic character becomes predominant and the durability declines, while as the structure given by SiO$_2$ becomes more prominent, a hardness quality like that of silica becomes predominant and the fixing performance declines.

As a consequence, the organosilicon polymer must have at least 5.0% of the structure given by R—SiO$_{3/2}$. That is, the proportion of the peak area assigned to the structure given by formula (T3) relative to the total peak area for the organosilicon polymer must be at least 5.0%. The proportion of this peak area can be, for example, not more than 85.0%.

Viewed from the standpoint of a high durability, the proportion of the peak area assigned to the structure with formula (T3) relative to the total peak area for the organosilicon polymer is preferably from 20.0% to 85.0%, more preferably from 40.0% to 80.0%, and even more preferably from 40.0% to 67.5%. The proportion of the peak area for the structure given by formula (T3) can be controlled using the reaction temperature during formation of the structure with formula (T3) and using the pH during the reaction.

In addition, using, in observation of the toner particle cross section using a transmission electron microscope (also referred to as a TEM in the following), long axis L for the chord that passes through the geometric center of the toner particle and provides the longest diameter in the toner particle cross section, line segment a for one of the line segments provided by dividing the long axis L at its midpoint, Arn (n=from 1 to 32), respectively, for the 32 line segments provided, using the line segment a as the point of reference, by drawing a line segment from the midpoint of the long axis L to the surface of the toner particle, advancing in each instance by 11.25°, RAn (n=from 1 to 32) for the length of each line segment, and FRAn (n=from 1 to 32) for the thickness of the surface layer on Arn (n=from 1 to 32), a high level of durability can be made to coexist with a high level of fixing performance by having—in the cross section of a toner particle for which Dtem, defined in accordance with the following formula (1), is in the range of the toner particle weight-average particle diameter±10%—the average thickness Dav. of the surface layer be from 5.0 nm to 100.0 nm.

$$Dtem=(RA1+RA2+RA3+RA4+RA5+RA6+RA7+RA8+\\RA9+RA10+RA11+RA12+RA13+RA14+RA15+\\RA16+RA17+RA18+RA19+RA20+RA21+RA22+\\RA23+RA24+RA25+RA26+RA27+RA28+RA29+\\RA30+RA31+RA32)/16 \quad (1)$$

The durability declines when this Dav. is below 5.0 nm, while the fixing performance declines when this Dav. exceeds 100.0 nm. This Dav. is preferably from 10.0 nm to 70.0 nm and is more preferably from 10.0 nm to 50.0 nm. The average thickness Dav. of the surface layer of organosilicon polymer can be controlled through, for example, the content of the organosilicon polymer, the proportions of hydrophilic groups and hydrophobic groups in the organosilicon polymer, and the reaction temperature, reaction time, reaction medium, and pH during hydrolysis, addition polymerization, and condensation polymerization.

Moreover, a high-durability toner capable of withstanding the stresses in the developing device can be obtained by having—in the cross section of a toner particle for which Dtem is in the range of the toner particle weight-average particle diameter±10%—the proportion of Arn line segments for which FRAn is not more than 5.0 nm be not more than 20.0%. When the proportion of Arn line segments for which FRAn is not more than 5.0 nm exceeds 20.0%, the toner durability declines, filming is produced on the surface of the developing roller, and shading non-uniformity is produced. The proportion of Arn line segments for which FRAn is not more than 5.0 nm is preferably not more than 10.0% and more preferably not more than 5.0%. The proportion of Arn line segments for which FRAn is not more than 5.0 nm is preferably as low as possible, and is, for example, at least 0.0%. Any combination of these numerical value ranges may be used.

The proportion of Arn line segments for which FRAn is not more than 5.0 nm can be controlled through, for example, the content of the organosilicon polymer, the proportions of hydrophilic groups and hydrophobic groups in the organosilicon polymer, and the reaction temperature, reaction time, reaction medium, and pH during hydrolysis, addition polymerization, and condensation polymerization.

However, the presence in the toner particle surface layer of an organosilicon polymer having the R—SiO$_{3/2}$ structure, which has a hardness quality like that of silica, raises concerns with regard to the effect on the fixing performance. As a result of intensive investigations, the present inventors found that coexistence with the fixing performance could also be brought about by having the number of inorganic fine particles in contact with the core particle in the surface layer be from 16 to 30 per one toner particle.

Inorganic fine particles generally exhibit a hard quality, and it is thought that as a consequence they lower the fixing performance when incorporated in a toner particle. However, by satisfying the indicated condition, it is thought that during fixing the inorganic fine particles rupture the surface layer and assist in melting of the toner and as a consequence support an excellent fixing performance.

When the number of inorganic fine particles is less than 16, the surface layer is not adequately ruptured and the fixing performance is then reduced. When the number of inorganic fine particles exceeds 30, the charging performance of the toner ends up being reduced and fogging is produced as a consequence. The number of inorganic fine particles is preferably from 19 to 29 and is more preferably from 20 to 24.

The number of inorganic fine particles in contact with the core particle in the surface layer can be controlled using, for example, the amount of inorganic fine particles used as a dispersion stabilizer added on a supplemental basis during a granulation step.

In addition, in 100 toner particles for which Dtem is in the range of the toner particle weight-average particle diameter±10%, the proportion of toner particles having at least one inorganic fine particle present in the core particle and not in contact with the surface layer must be not more than 10%. When the proportion of toner particles having an inorganic fine particle present in the core particle and not in contact with the surface layer exceeds 10%, this causes a reduction in the fixing performance as above. The proportion of such toner particles is preferably not more than 5% and more preferably not more than 2%. The proportion of such toner particles is preferably as low as possible and, for example, is at least 0%. Any combination of these numerical value ranges may be used.

The proportion of toner particles having at least one inorganic fine particle present in the core particle and not in contact with the surface layer can be controlled through, for example, the amount of inorganic fine particles used as a dispersion stabilizer added on a supplemental basis during a granulation step.

Known inorganic fine particles can be used without particular limitation as the inorganic fine particles, but the inorganic fine particles preferably contain at least one selected from the group consisting of the element calcium and the element magnesium, with the incorporation of the element calcium being more preferred.

The content of the at least one selected from the group consisting of the element calcium and the element magnesium (preferably the element calcium) in the inorganic fine particles is preferably from 50 mass % to 100 mass % and more preferably from 85 mass % to 100 mass %.

Using Dm for the number-average particle diameter for the primary particle diameter of the inorganic fine particles, Dm is preferably from 50.0 nm to 800.0 nm. By having Dm be at least 50.0 nm, rupture of the surface layer during fixing is facilitated and a trend of additional improvement in the fixing performance is established. By having Dm be not more than 800.0 nm, the influence on the toner charging performance can be suppressed and a trend of greater suppression of the occurrence of fogging is established. Dm is more preferably from 90.0 nm to 200.0 nm. This Dm can be controlled through, for example, the temperature and stirrer rotation rate during the preparation of inorganic fine particles used as a dispersion stabilizer added on a supplemental basis.

In the TEM observation of the toner particle cross section, the proportion of toner particles for which at least one inorganic fine particle is present in each of the region of the surface layer sandwiched by Ar1 and Ar5, the region of the surface layer sandwiched by Ar5 and Ar9, the region of the surface layer sandwiched by Ar9 and Ar13, the region of the surface layer sandwiched by Ar13 and Ar17, the region of the surface layer sandwiched by Ar17 and Ar21, the region of the surface layer sandwiched by Ar21 and Ar25, the region of the surface layer sandwiched by Ar25 and Ar29, and the region of the surface layer sandwiched by Ar29 and Ar1 (these regions are also collectively referred to in the following simply as the "eight equally divided regions of the surface layer"), is at least 90% of 100 toner particles for which Dtem is in the range of the toner particle weight-average particle diameter±10%.

As a consequence of this, the surface layer of the toner particle can be completely ruptured during fixing and an even better fixing performance can be established. The proportion for these toner particles is more preferably at least 95%. The proportion for these toner particles is preferably as high as possible, for example, not more than 100%. Any combination of these numerical value ranges may be used.

The proportion for these toner particles can be controlled through, for example, the amount of inorganic fine particles used as a dispersion stabilizer added on a supplemental basis during a granulation step, and the stirring rotation rate during the granulation step.

In the TEM observation of the toner particle cross section, the proportion of toner particles for which the number of inorganic fine particles that contact the core particle in the surface layer is from 16 to 30, is preferably at least 90% of 100 toner particles for which Dtem is in the range of the toner particle weight-average particle diameter±10%. This serves to provide a large toner population for which rupture of the organosilicon polymer surface layer during fixing proceeds well and to provide even better fixing as a consequence. At least 95% is more preferred. This toner particle proportion is preferably as high as possible and, for example, is not more than 100%. Any combination of these numerical value ranges may be used.

The average thickness Dav. of the surface layer and the primary particle diameter Dm of the inorganic fine particles preferably satisfy Dav./Dm<1.00. By having Dav./Dm<1.00 be satisfied, the particle diameter of the inorganic fine particles is then made sufficiently large relative to the average thickness of the surface layer, and as a consequence rupture of the surface layer by the inorganic fine particles is facilitated and an even better fixing performance is provided. Dav./Dm≤0.80 is more preferred.

Embodiments of the present disclosure are described in detail in the following.

The following compounds are specific examples of organosilicon compounds for producing the organosilicon polymer: methyltrimethoxysilane, methyltriethoxysilane, methyltrichlorosilane, ethyltrimethoxysilane, ethyltriethoxysilane, ethyltrichlorosilane ethyltriacetoxysilane, propyltrimethoxysilane, propyltriethoxysilane, propyltrichlorosilane, butyltrimethoxysilane, butyltriethoxysilane, butyltrichlorosilane, butylmethoxydichlorosilane, butylethoxydichlorosilane, hexyltrimethoxysilane, hexyltriethoxysilane, phenyltrimethoxysilane, and phenyltriethoxysilane. A single one of these organosilicon compounds may be used by itself or at least two thereof may be used in combination.

It is known that in the sol-gel reaction the bonding status of the siloxane bonds that are produced generally varies as a function of the acidity of the reaction medium.

Specifically, when the medium is acidic, a hydrogen ion electrophilically adds to the oxygen in one reactive group (for example, the alkoxy group). The oxygen atom in a water molecule then coordinates to the silicon atom and conversion into the hydrosilyl group occurs by a substitution reaction. Assuming enough water is present, since one oxygen atom of the reactive group (for example, the alkoxy group) is attacked by one $H^+$, the substitution reaction to give the hydroxy group will be slow when the $H^+$ content in the reaction medium is low. The polycondensation reaction therefore occurs before all of the reactive groups bonded in the silane have hydrolyzed and a one-dimensional chain polymer or a two-dimensional polymer is then produced relatively readily.

When, on the other hand, the medium is alkaline, a hydroxide ion adds to the silicon with passage through a pentacoordinate intermediate. Due to this, all of the reactive groups (for example, the alkoxy group) are readily eliminated and readily replaced by the silanol group. Particularly when a silicon compound is used that has at least three reactive groups in the same silane, hydrolysis and polycondensation proceed three dimensionally and an organosilicon polymer is formed that has abundant three-dimensional crosslinking bonds. In addition, the reaction is also complete in a short period of time.

Accordingly, the sol-gel reaction for forming the organosilicon polymer is preferably carried out under alkaline conditions, and in specific terms, when production is carried out in an aqueous medium, preferably the reaction is run for a reaction time of at least 5 hours at a pH of at least 8.0 and a reaction temperature of at least 90° C. Doing this supports the formation of an organosilicon polymer having a higher strength and an excellent durability.

When the medium used in the aforementioned suspension polymerization is an aqueous medium, the following inorganic fine particles may be used as a dispersion stabilizer for the particles of the polymerizable monomer composition: for example, tricalcium phosphate, magnesium phosphate, calcium carbonate, magnesium carbonate, calcium hydroxide, magnesium hydroxide, calcium metasilicate, and calcium sulfate.

Any production method may be used for the production method for toner particle production, but suspension polymerization is preferred.

Toner particle production by the suspension polymerization method is taken up in the following as an example, and, while a toner particle production method is described in detail, the toner particle production method is in no way limited to or by the following method.

The suspension polymerization method is a production method in which a polymerizable monomer composition, containing polymerizable monomer and optionally colorant, is added to an aqueous medium; the polymerizable monomer composition in the aqueous medium is granulated to form particles of the polymerizable monomer composition; and the polymerizable monomer contained in the particles of the polymerizable monomer composition is polymerized to obtain toner particles.

The individual steps in a toner particle production method using the suspension polymerization method are described in the following.

Preparation of Polymerizable Monomer Composition

A polymerizable monomer composition containing polymerizable monomer and an organosilicon compound and optionally a colorant is prepared. When the polymerizable monomer composition contains colorant, the colorant may be mixed with additional composition after preliminary dispersion in polymerizable monomer using, for example, a stirred media mill, or dispersion may be carried out at the same time as the mixing of this additional composition or after the mixing of this additional composition.

Granulation Step

The polymerizable monomer composition is introduced into an aqueous medium that contains inorganic fine particles used as a dispersion stabilizer as indicated above, and the polymerizable monomer composition in the aqueous medium is granulated into droplets by dispersion to obtain droplets of the polymerizable monomer composition.

The inorganic fine particles attach to the surface of the polymerizable monomer composition droplets during the granulation step. When the polymerizable monomer composition contains a polar resin, this polar resin is attracted to the interface by the inorganic fine particles attached to the droplet surface. While the polar resin natively tends to be present, due to its polarity, at the surface of the polymerizable monomer composition, the effect of this attraction to the interface is to further facilitate the presence of the polar resin at the surface.

The granulation step can be carried out, for example, using a vertical stirred tank fitted with a stirrer that develops a high shear force. For example, a commercial high-shear stirrer, e.g., Ultra-Turrax (IKA), T. K. Homomixer (Tokushu Kika Kogyo Co., Ltd.), T. K. Filmics (Tokushu Kika Kogyo Co., Ltd.), Clearmix (M Technique Co., Ltd.), Cavimix (Pacific Machinery & Engineering Co., Ltd.), and so forth, can be used as the stirrer that develops a high shear force. Also usable for the stirrer is a disperser that has a circulation mechanism and that can develop an inline high-shear force within the circulation mechanism, wherein the circulation mechanism removes a portion of the process liquid within the vertical stirred tank from the lower portion of the stirred tank and returns same to the stirred tank. Commercial dispersers such as the Colloid Mill (IKA), Cavitron (Pacific Machinery & Engineering Co., Ltd.), W Motion (M Technique Co., Ltd.), and so forth, can be used as the inline disperser. Inorganic fine particles functioning as a dispersion stabilizer can also be added on a supplemental basis during the granulation step. This functions to facilitate the presence of inorganic fine particles in contact with the core particle in the surface layer.

Polymerization Step

The thusly obtained dispersion of the polymerizable monomer composition is introduced into the polymerization step to obtain a toner particle dispersion. A common temperature-controllable stirred tank can be used in the polymerization step.

The polymerization temperature is at least 40° C. and is preferably from 50° C. to 90° C. The polymerization temperature may be held constant from beginning to end, or may be raised in the latter half of the polymerization step with the goal of obtaining a desired molecular weight distribution. The stirring blade used for stirring may be any stirring blade that supports maintenance of a uniform temperature within the tank and that can suspend the starting material dispersion for the toner and can do so without stagnation of this starting material dispersion. The stirring blade or stirring means can be exemplified by common stirring blades such as paddle blades, pitched paddle blades, swept three-blade propellers, propeller blades, disk turbine blades, helical ribbon blades, anchor blades, and so forth, and by "Fullzone" (Shinko Pantec Co., Ltd.), "Twinstar" (Shinko Pantec Co., Ltd.), "Maxblend" (Sumitomo Heavy Industries, Ltd.), "Super Mix" (Satake Chemical Equipment Mfg., Ltd.), and "Hi-F Mixer" (Soken Chemical & Engineering Co., Ltd.).

In addition, by controlling the temperature and pH in the polymerization step into the ranges indicated above, a sol-gel reaction can be run on the organosilicon compound in the polymerizable monomer composition and a surface layer containing inorganic fine particles and organosilicon polymer can be formed.

Distillation Step

In order as necessary to remove volatile impurities such as, e.g., unreacted polymerizable monomer, by-products, and so forth, a portion of the aqueous medium may be distilled off in a distillation step after the completion of polymerization. The distillation step may be carried out at normal pressure or under reduced pressure.

Washing Step, Solid-Liquid Separation Step, and Drying Step

The polymer particle dispersion can also be treated with acid or alkali with the goal of removing excess dispersion stabilizer attached to the polymer particle surface. After this, the polymer particles are separated from the liquid phase using an ordinary solid-liquid separation method, and the polymer particles are washed with a fresh addition of water in order to remove the acid or alkali and excess dispersion stabilizer components dissolved therein. Thorough washing is performed by repeating this washing step several times and solid-liquid separation is carried out again to obtain toner particles. As necessary, the obtained toner particles may be dried using a known drying means.

Classification Step

When a sharper granulometry is required of the thusly obtained toner particles, particles outside the desired particle size distribution may also be classified and removed by carrying out a classification using, for example, an air classifier.

The following vinyl polymerizable monomers are advantageous examples of the polymerizable monomer referenced above: styrene; styrene derivatives, e.g., α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene; acrylic polymerizable monomers, e.g., methyl acrylate, ethyl acrylate, n-propyl acrylate, isopropyl acrylate, n-butyl acrylate, isobutyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic polymerizable monomers, e.g., methyl methacrylate, ethyl methacrylate, n-propyl methacrylate, isopropyl methacrylate, n-butyl methacrylate, isobutyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; esters of methylene aliphatic monocarboxylic acids; vinyl esters, e.g., vinyl acetate, vinyl propionate, vinyl benzoate, vinyl butyrate, and vinyl formate; vinyl ethers such as vinyl methyl ether, vinyl ethyl ether, and vinyl isobutyl ether; as well as vinyl methyl ketone, vinyl hexyl ketone, and vinyl isopropyl ketone.

The content of this polymerizable monomer in the polymerizable monomer composition is preferably from 50 mass % to 100 mass % and is more preferably from 70 mass % to 100 mass %. A single one of these polymerizable monomers may be used by itself or a combination of at least two thereof may be used.

The following are examples of polymerization initiators that can be used during the polymerization: azo polymerization initiators and diazo polymerization initiators such as 2,2'-azobis(2,4-divaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile, and peroxide polymerization initiators such as benzoyl peroxide, methyl ethyl ketone peroxide, diisopropyl peroxycarbonate, cumene hydroperoxide, 2,4-dichlorobenzoyl peroxide, lauroyl peroxide, and t-butyl peroxypivalate. The content of this polymerization initiator is preferably from 0.5 mass parts to 30.0 mass parts per 100 mass parts of the polymerizable monomer. A single one of these polymerization initiators may be used by itself or at least two thereof may be used in combination.

A chain transfer agent may be added to the polymerization in order to control the molecular weight of the binder resin constituting the toner particle. The preferred amount of addition is from 0.001 mass parts to 15.0 mass parts per 100 mass parts of the polymerizable monomer.

A crosslinking agent may be added to the polymerization in order to control the molecular weight of the binder resin that constitutes the toner particle. For example, a crosslinkable monomer can be used as this crosslinking agent.

The crosslinking monomer can be exemplified by the following: divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, the diacrylates of polyethylene glycol #200, #400, and #600, dipropylene glycol diacrylate, polypropylene glycol diacrylate, polyester-type diacrylates (MANDA, Nippon Kayaku Co., Ltd.), and crosslinking monomers provided by changing the acrylate in the preceding to methacrylate.

Polyfunctional crosslinking monomers can be exemplified by the following: pentaerythritol triacrylate, trimethylolethane triacrylate, trimethylolpropane triacrylate, tetramethylolmethane tetraacrylate, and oligoester acrylates and the methacrylates of the preceding, as well as 2,2-bis(4-methacryloxy polyethoxyphenyl)propane, diaryl phthalate, triallyl cyanurate, triallyl isocyanurate, triallyl trimellitate, and diallyl chlorendate.

The preferred amount of addition for the crosslinking agent is from 0.001 mass parts to 15.0 mass parts per 100 mass parts of the polymerizable monomer.

There are no particular limitations on the colorant, and the known colorants given below can be used.

For example, yellow iron oxide, Naples Yellow, Naphthol Yellow S, Hansa Yellow G, Hansa Yellow 10G, Benzidine Yellow G, Benzidine Yellow GR, quinoline yellow lake, condensed azo compounds such as Permanent Yellow NCG and tartrazine lake, isoindolinone compounds, anthraquinone compounds, azo metal complexes, methine compounds, and allylamide compounds may be used as a yellow pigment. Specific examples are as follows: C. I. Pigment Yellow 12, 13, 14, 15, 17, 62, 74, 83, 93, 94, 95, 109, 110, 111, 128, 129, 147, 155, 168, and 180.

Orange pigments can be exemplified by the following: Permanent Orange GTR, Pyrazolone Orange, Vulcan Orange, Benzidine Orange G, Indathrene Brilliant Orange RK, and Indathrene Brilliant Orange GK.

For example, red iron oxide; condensed azo compounds such as Permanent Red 4R, Lithol Red, Pyrazolone Red, Watching Red calcium salt, Lake Red C, Lake Red D, Brilliant Carmine 6B, Brilliant Carmine 3B, eosin lake, Rhodamine Lake B, and Alizarin Lake; diketopyrrolopyrrole compounds; anthraquinone; quinacridone compounds; basic dye lake compounds; naphthol compounds; benzimidazolone compounds; thioindigo compounds; and perylene compounds are examples of red pigments.

Blue pigments can be exemplified by alkali blue lake; Victoria Blue Lake; copper phthalocyanine compounds and derivatives thereof, e.g., Phthalocyanine Blue, metal-free Phthalocyanine Blue, partially chlorinated Phthalocyanine Blue, Fast Sky Blue, and Indathrene BG; anthraquinone compounds; and basic dye lake compounds. Specific examples are as follows: C. I. Pigment Blue 1, 7, 15, 15:1, 15:2, 15:3, 15:4, 60, 62, and 66.

Purple pigments can be exemplified by Fast Violet B and Methyl Violet Lake.

Green pigments can be exemplified by Pigment Green B, Malachite Green Lake, and Final Yellow Green G.

White pigments can be exemplified by zinc white, titanium oxide, antimony white, and zinc sulfide.

Black pigments can be exemplified by carbon black, aniline black, nonmagnetic ferrite and magnetite, and black pigments provided by color mixing using the aforementioned yellow colorants, red colorants, and blue colorants to give a black color.

A single one of these colorants may be used by itself or a combination of at least two thereof may be used. These colorants may also be used in solid solution form. The colorant content is preferably from 3.0 mass parts to 15.0 mass parts per 100 mass parts of the binder resin or polymerizable monomer.

A charge control agent, other than resin having an ionizable functional group having a prescribed pKa during toner production, can be used in the toner. A known charge control agent can be used as this charge control agent. The amount of addition of this charge control agent is preferably from 0.01 mass parts to 10.0 mass parts per 100 mass parts of the binder resin or polymerizable monomer.

The toner particle as such may be used as a toner, or the toner may also be provided by the optional external addition of any of various organic fine powders or inorganic fine powders to the toner particle. Considering the durability at the time of addition to the toner particle, a particle diameter that is not more than one-tenth the weight-average particle diameter of the toner particle is preferred for this organic or inorganic fine powder. The following, for example, are used for the organic fine powder or inorganic fine powder.

(1) Flowability-imparting agents: silica, alumina, titanium oxide, carbon black, and fluorinated carbon.

(2) Abrasives: metal oxides (for example, strontium titanate, cerium oxide, alumina, magnesium oxide, chromium oxide), nitrides (for example, silicon nitride), carbides (for example, silicon carbide), metal salts (for example, calcium sulfate, barium sulfate, calcium carbonate).

(3) Lubricants: fluororesin powders (for example, vinylidene fluoride, polytetrafluoroethylene), metal salts of fatty acids (for example, zinc stearate, calcium stearate).

(4) Charge control particles: metal oxides (for example, tin oxide, titanium oxide, zinc oxide, silica, alumina), carbon black.

An organic fine powder or inorganic fine powder can also be used to treat the surface of the toner particle in order to improve toner flowability and provide a more uniform toner particle charging. Treatment agents for performing a hydrophobic treatment on an organic fine powder or inorganic fine powder can be exemplified by unmodified silicone varnishes, various modified silicone varnishes, unmodified silicone oils, various modified silicone oils, silane compounds, silane coupling agents, organosilicon compounds other than the preceding, and organotitanium compounds. A single one of these treatment agents may be used by itself or at least two thereof may be used in combination.

The methods used to measure the property values involved with the present disclosure are described in the following.

Method for Separating the TIF-Insoluble Matter in the Toner Particle for Use in NMR Measurement The tetrahydrofuran (TIF)-insoluble matter in the toner particle is separated as follows.

10.0 g of the toner particle is weighed out and placed in an extraction thimble (No. 86R, Toyo Roshi Kaisha, Ltd.) and this is placed in a Soxhlet extractor. Extraction is performed for 20 hours using 200 mL of THE as the solvent, and the filtration residue in the extraction thimble is vacuum dried for several hours at 40° C. to yield the TIF-insoluble matter in the toner particle for submission to NMR measurement. When a magnetic body is incorporated in the toner particle, preliminary separation may be carried out using a magnet, for example, at the time of extraction.

When the toner particle surface has been treated with, for example, an external additive, the toner particle is obtained by removing the external additive using the following method.

A sucrose concentrate is prepared by the addition of 160 g of sucrose (Kishida Chemical Co., Ltd.) to 100 mL of deionized water and dissolving while heating on a water bath. 31 g of this sucrose concentrate and 6 mL of Contaminon N (a 10 mass % aqueous solution of a neutral pH 7 detergent for cleaning precision measurement instrumentation, comprising a nonionic surfactant, anionic surfactant, and organic builder, Wako Pure Chemical Industries, Ltd.) are introduced into a centrifugal separation tube to prepare a dispersion. 1.0 g of the toner is added to this dispersion, and clumps of the toner are broken up using, for example, a spatula.

The centrifugal separation tube is shaken with a shaker for 20 minutes at 350 strokes per minute (spm). After the shaking, the solution is transferred over to a glass tube (50 mL) for swing rotor service, and separation is performed with a centrifugal separator using conditions of 3,500 rpm and 30 minutes. This procedure separates the external additive that has detached from the toner particle. An adequate separation of the toner and aqueous solution is confirmed by visual inspection, and the toner separated into the uppermost layer is recovered using, e.g., a spatula. The recovered toner is filtered on a reduced-pressure filter and is then dried for at least one hour in a dryer to yield the toner particle.

This procedure is carried out a plurality of times to secure the required amount.

Method for Confirming the Structure Given by Formula (T3)

The following method is used to confirm the structure represented by formula (T3) in the organosilicon polymer contained in the toner particle.

The presence/absence of the alkyl group or phenyl group represented by R in formula (T3) is confirmed by $^{13}$C-NMR and $^{29}$Si-NMR. The details of the structure given by formula (T3) are confirmed by $^{1}$H-NMR, $^{13}$C-NMR, and $^{29}$Si-NMR. The instrumentation and measurement conditions used are given in the following.

$^{1}$H-NMR Measurement Conditions

Instrument: AVANCE III 500 from Bruker
Probe: 4 mm MAS BB/1H
Measurement temperature: room temperature
Sample spinning rate: 6 kHz
Sample: 150 mg of the measurement sample (the aforementioned THF-insoluble matter in the toner particle for submission to NMR measurement) was introduced into a sample tube with a diameter of 4 mm.

The presence/absence of the alkyl group or phenyl group represented by R in formula (T3) is confirmed using this method. When a signal can be confirmed, the structure with formula (T3) is scored as "present".

Measurement Conditions for $^{13}$C-NMR (Solid State)
Measurement nucleus frequency: 125.77 MHz
Reference substance: glycine (external reference: 176.03 ppm)
Observation width: 37.88 kHz
Measurement method: CP/MAS
Contact time: 1.75 msec
Repeat time: 4 seconds
Number of scans: 2048
LB value: 50 Hz
Measurement Conditions for $^{29}$Si-NMR (Solid State)
Instrument: AVANCE III 500 from Bruker
Probe: 4 mm MAS BB/$^{1}$H
Measurement temperature: room temperature
Sample spinning rate: 6 kHz
Sample: 150 mg of the measurement sample (THF-insoluble matter in the toner particle for submission to NMR measurement) is introduced into a sample tube with a diameter of 4 mm.
Measurement nucleus frequency: 99.36 MHz
Reference substance: DSS (external reference: 1.534 ppm)
Observation width: 29.76 kHz
Measurement method: DD/MAS, CP/MAS
$^{29}$Si 900
Pulse width: 4.00 μsec@-1 db
Contact time: from 1.75 msec to 10 msec Repeat time: 30 seconds (DD/MAS), 10 seconds (CP/MAS)
Number of scans: 2048
LB value: 50 Hz Method for Measuring the Proportion of the Peak Area Assigned to the Structure Given by Formula (T3)

After the $^{29}$Si-NMR measurement on the THF-insoluble matter in the toner particle, peak separation into the Q1 structure, Q2 structure, Q3 structure, and Q4 structure indicated below is performed for the toner particle by curve fitting a plurality of silane components having different substituents and bonding groups, and the mol % for each component is calculated from the peak area ratios.

Curve fitting is performed using EXcalibur for Windows (registered trademark) version 4.2 (EX series) software for the JNM-EX400 from JEOL Ltd. "1D Pro" is clicked from the menu icon and the measurement data is loaded.

Figure 3:
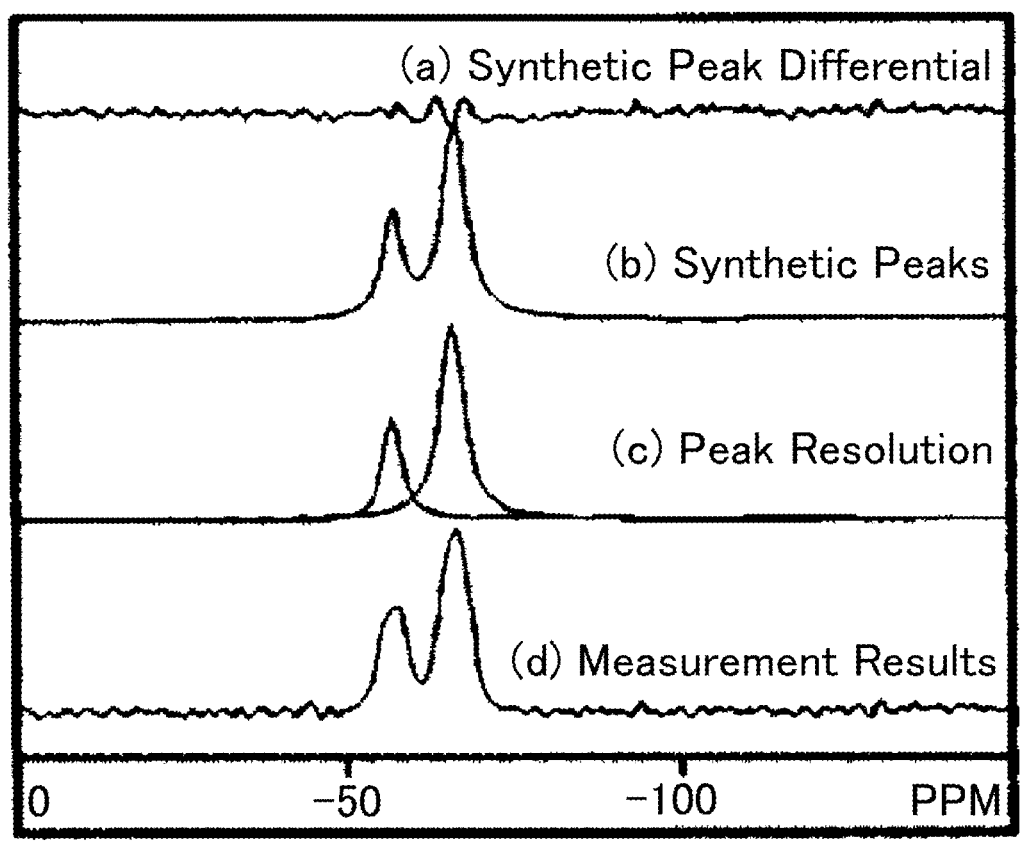
FIG. 3 is an example of the $^{29}$Si-NMR measurement of the THF-insoluble matter of a toner particle.

Curve fitting was then carried out by selecting "Curve fitting function" from "Command" on the menu bar. An example of this is given in FIG. 3. Peak resolution is carried out so as to minimize the peaks in the synthetic peak differential (a), which is the differential between the synthetic peaks (b) and the measurement results (d).

The area for the Q1 structure, area for the Q2 structure, area for the Q3 structure, and area for the Q4 structure are determined, and SQ1, SQ2, SQ3, and SQ4 are determined using the formulas given below.

$Q1$ structure: $(R^1)(R^2)(R^3)SiO_{1/2}$     formula (2)

$Q2$ structure: $(R^4)(R^5)Si(O_{1/2})_2$     formula (3)

$Q3$ structure: $R^6Si(O_{1/2})_3$     formula (4)

$Q4$ structure: $Si(O_{1/2})_4$     formula (5)

Q1:

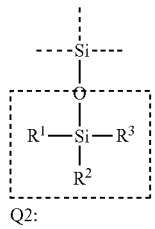

(2)

Q2:

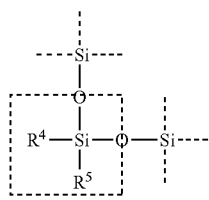

(3)

Q3:

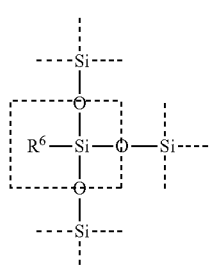

(4)

Q4:

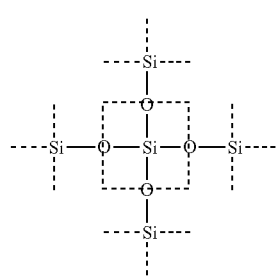

(5)

The $R^1$, $R^2$, $R^3$, $R^4$, $R^5$ and $R^6$ in formulas (2), (3), and (4) represent a silicon-bonded organic group, halogen atom, hydroxyl group, or alkoxy group.

The silane monomer is identified from the chemical shift value, and the total peak area for the organosilicon polymer is taken to be the sum of the area for the Q1 structure, the area for the Q2 structure, the area for the Q3 structure, and the area for the Q4 structure, from the total peak area in the $^{29}$Si-NMR measurement on the toner particle.

$SQ1+SQ2+SQ3+SQ4=1.000$ $SQ1=\{$area for $Q1$ structure/(area for $Q1$ structure+ area for $Q2$ structure+area for $Q3$ structure+ area for $Q4$ structure)$\}$ $SQ2=\{$area for $Q2$ structure/(area for $Q1$ structure+ area for $Q2$ structure+area for $Q3$ structure+ area for $Q4$ structure)$\}$ $SQ3=\{$area for $Q3$ structure/(area for $Q1$ structure+ area for $Q2$ structure+area for $Q3$ structure+ area for $Q4$ structure)$\}$ $SQ4=\{$area for $Q4$ structure/(area for $Q1$ structure+ area for $Q2$ structure+area for $Q3$ structure+ area for $Q4$ structure)$\}$ The peak area for the structure given by formula (T3) below is at least 5.0% relative to the total peak area for the organosilicon polymer. That is, in the measurement method described in the preceding, the value indicating the structure given by R—SiO$_{3/2}$ is the SQ3 defined above. Its value is at least 0.05.

$R-Si(O_{1/2})_3$     (T3)

Chemical shift values for the silicon in the Q1 structure, Q2 structure, Q3 structure, and Q4 structure are given below.

Example for the $Q1$ structure ($R^1=R^2=-OC_2H_5$, $R^3=-CH_3$): $-47$ ppm

Example for the $Q2$ structure ($R^4=-OC_2H_5, R^5=-CH_3$): $-56$ ppm

Example for the $Q3$ structure ($R^6=-CH_3$): $-65$ ppm

The chemical shift value for the silicon in the case of the Q4 structure is as follows.

$Q4$ structure: $-108$ ppm

Methods for Measuring the Average Thickness Day. of the Surface Layer and the Proportion of Arn Line Segments for which FRAn (thickness of surface layer) is not more than 5.0 nm, by Observation of the Toner Particle Cross Section using a Transmission Electron Microscope (TEM)

Observation of the toner particle cross section is performed using the following method.

In the specific method for observing the toner particle cross section, the toner particles are thoroughly dispersed in a normal temperature-curable epoxy resin and curing is then carried out for 2 days in a 40° C. atmosphere. Thin-section samples are sliced from the resulting cured material using a microtome equipped with a diamond blade. The toner particle cross section is observed by enlarging this sample in magnification from 10,000× to 100,000× using a transmission electron microscope (TEM) (Tecnai TF20XT electron microscope from FEI).

The presence of organosilicon polymer in the surface layer is confirmed in the present disclosure utilizing the differences in the atomic weights of the atoms in the resin and organosilicon compound used and utilizing the fact that a bright contrast is provided when the atomic weight is high. Staining with ruthenium tetroxide and staining with osmium tetroxide are used to provide contrast between materials.

Toner particles for which Dtem, as determined from the toner particle cross section acquired from the TEM micrograph, is in the range of ±10% of the toner particle weight-average particle diameter, as determined by the method given below using a Coulter Counter, are the target toner particles for measurement of the average thickness Dav. of the surface layer of the toner particle by TEM and measurement of the proportion of Arn line segments for which FRAn (surface layer thickness) is not more than 5.0 nm.

Figure 2:
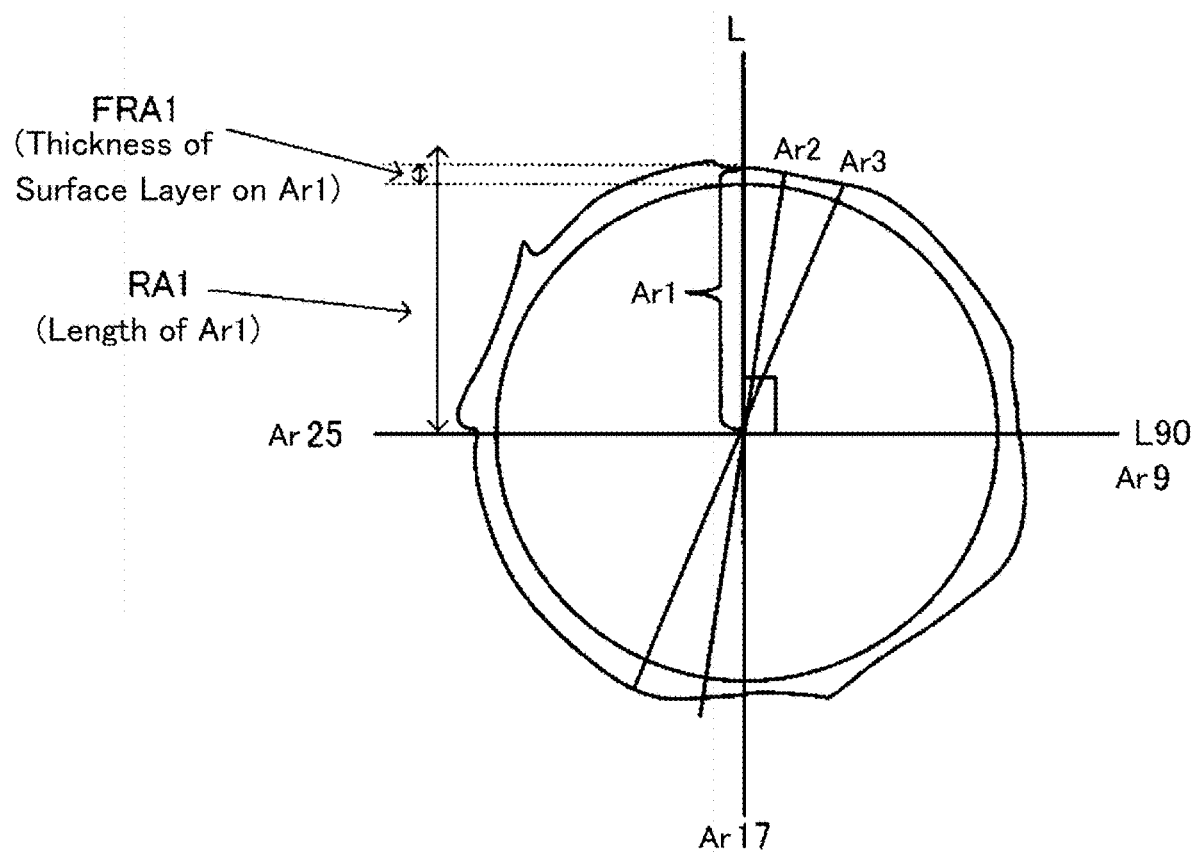
FIG. 2 is an example of an image of a toner particle cross section as observed with a transmission electron microscope.

Method for Measuring Dtem from the Toner Cross Section Obtained from the TEM Micrograph The toner particle cross section is divided into 32 equal sections using, as the center, the point of intersection between the long axis L, which is the largest diameter in the toner particle cross section, and the axis L90, which passes through the midpoint of the long axis L and is orthogonal thereto (refer to FIG. 2). That is, 32 line segments from this midpoint to the toner particle surface are produced by drawing 16 straight lines that pass through the midpoint of the long axis L and traverse the cross section with an equal angle of intersection at the midpoint (angle of intersection=11.25°). Arn (n=from 1 to 32) is then used for the respective line segments (partitioning axes) that run from the center to the toner particle surface layer, RAn is used for the length of each line segment (partitioning axis), and FRAn (n=from 1 to 32) is used for the thickness of the surface layer on a line segment Arn.

Dtem, which is determined from the toner cross section obtained from the TEM micrograph, is then determined using the following formula.

$$Dtem=(RA1+RA2+RA3+RA4+RA5+RA6+RA7+RA8+\\RA9+RA10+RA11+RA12+RA13+RA14+RA15+\\RA16+RA17+RA18+RA19+RA20+RA21+RA22+\\RA23+RA24+RA25+RA26+RA27+RA28+RA29+\\RA30+RA31+RA32)/16$$

Measurement of the Average Thickness (Dav.) of the Surface Layer of the Toner Particle The average thickness (Dav.) of the surface layer of the toner particle is determined using the following method. First, using the following method, the average thickness D(n) of the surface layer is determined for one toner particle for which Dtem is in the range of the toner particle weight-average particle diameter 10%.

$$D(n)=\text{(sum at the 32 positions of the thickness of the surface layer } on \text{ the partitioning axes)}/32=\\(FRA1+FRA2+FRA3+FRA4+FRA5+FRA6+\\FRA7+FRA8+FRA9+FRA10+FRA11+FRA12+\\FRA13+FRA14+FRA15+FRA16+FRA17+\\FRA18+FRA19+FRA20+FRA21+FRA22+\\FRA23+FRA24+FRA25+FRA26+FRA27+\\FRA28+FRA29+FRA30+FRA31+FRA32)/32$$

For averaging, the average thickness D(n) (n=from 1 to 100) of the toner particle surface layer is determined for 100 toner particles for which Dtem is in the range of the toner particle weight-average particle diameter±10%, and the average value per one toner particle is calculated and used as the average thickness (Dav.) of the toner particle surface layer.

$$Dav.=\{D(1)+D(2)+D(3)+D(4)+D(5)+\ldots+D(100)\}/100$$

Method for Measuring the Proportion of Arn Line Segments for which FRAn (surface layer thickness) is not more than 5.0 nm First, operating on one toner particle for which Dtem is in the range of the toner particle weight-average particle diameter±10%, the proportion of Arn line segments for which FRAn (surface layer thickness) is not more than 5.0 nm is determined for this toner particle using the following method.

[proportion of *Arn* line segments for which FRAn (surface layer thickness) is *not* more than 5.0 nm]=({number of *Arn* line segments for which FRAn (surface layer thickness) is *not* more than 5.0 nm}/32)×100

This calculation is performed on 100 toner particles for which Dtem is in the range of the toner particle weight-average particle diameter±10%, and the average value is determined for this 100 and is used as the proportion, for the toner particle, of Arn line segments for which FRAn (surface layer thickness) is not more than 5.0 nm.

Method for Measuring the Number of Inorganic Fine Particles in contact with the Core Particle in the Surface Layer, and Method for Measuring the Proportion of Toner Particles for which this Number is from 16 to 30

Using a Tecnai TF20XT electron microscope from FEI for observation of the toner particle cross section using a transmission electron microscope (TEM), bright field images of the toner particle cross section are acquired at an acceleration voltage of 200 kV. Then, using a GIF Tridiem EELS detector from Gatan, Inc., the EF mapping image of the Si—K edge (99 ev) is acquired by the three window method and the elements of the individual inorganic fine particles are identified and the number of inorganic fine particles in contact with the core particle in the surface layer is counted. This measurement was performed on 100 toner particles for which Dtem was in the range of the toner particle weight-average particle diameter±10%, and the average value thereof was used as the number of inorganic fine particles that contact the core particle in the surface layer. The proportion of toner particles for which from 16 to 30 inorganic fine particles are present in contact with the core particle in this surface layer is also similarly determined.

This elemental analysis is also used to determine whether the inorganic fine particles contain at least one selected from the group consisting of the element calcium and the element magnesium.

Method for Measuring the Proportion of Toner Particles That Have At Least One Inorganic Fine Particle Present in the Core Particle and Not in Contact With the Surface Layer The observation of inorganic fine particles present in the core particle and not in contact with the surface layer can be carried out as for the method described above for measuring the number of inorganic fine particles in contact with the core particle in the surface layer. This observation is carried out on 100 toner particles for which Dtem is in the range of the toner particle weight-average particle diameter±10% to determine the proportion of toner particles having at least one inorganic fine particle present in the core particle and not in contact with the surface layer.

Measurement of the Number-Average Particle Diameter Dm for the Primary Particle Diameter of the Inorganic Fine Particles For the number-average particle diameter Dm for the primary particle diameter of the inorganic fine particles, the particle diameter of at least 100 inorganic fine particles is measured using the enlarged image in the observation of the toner particle cross section described above, and the number-average particle diameter Dm for the primary particle diameter is determined as the arithmetic average thereof. When the shape is spherical, its absolute maximum length is counted as the particle diameter; when a long diameter and a short diameter are present, the long diameter is counted as the particle diameter.

Proportion of Toner Particles for which at least One Inorganic Fine Particle is Present in Each of Eight Equally Divided Regions of the Surface Layer Using the methods for measuring the average thickness (Dav.) of the toner particle surface layer and the proportion of Arn line segments for which FRAn (surface layer thickness) is not more than 5.0 nm, in which measurement is carried out by observation of the toner particle cross section using a transmission electron microscope (TEM), the proportion of toner particles for which at least one inorganic fine particle is present in each of eight equally divided regions of the surface layer, is determined as the proportion—per 100 toner particles for which Dtem is in the range of the toner particle weight-average particle diameter±10%—of toner particles for which at least one inorganic fine particle is present in each of the following: the region of the surface layer sandwiched by Ar1 and Ar5, the region of the surface layer sandwiched by Ar5 and Ar9, the region of the surface layer sandwiched by Ar9 and Ar13, the region of the surface layer sandwiched by Ar13 and Ar17, the region of the surface layer sandwiched by Ar17 and Ar21, the region of the surface layer sandwiched by Ar21 and Ar25, the region of the surface layer sandwiched by Ar25 and Ar29, and the region of the surface layer sandwiched by Ar29 and Ar1.

Method for Measuring the Weight-Average Particle Diameter (D4) of the Toner Particle The weight-average particle diameter (D4) of the toner particle is determined as follows. The measurement instrument used is a "Coulter Counter Multisizer 3" (registered trademark, Beckman Coulter, Inc.), a precision particle size distribution measurement instrument operating on the pore electrical resistance method and equipped with a 100-µm aperture tube. The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels.

The aqueous electrolyte solution used for the measurements is prepared by dissolving special-grade sodium chloride in deionized water to provide a concentration of 1 mass % and, for example, "ISOTON II" (Beckman Coulter, Inc.) can be used.

The dedicated software is configured as follows prior to measurement and analysis.

In the "modify the standard operating method (SOMME)" screen in the dedicated software, the total count number in the control mode is set to 50,000 particles; the number of measurements is set to 1 time; and the Kd value is set to the value obtained using "standard particle 10.0 µm" (Beckman Coulter, Inc.). The threshold value and noise level are automatically set by pressing the "threshold value/noise level measurement button". In addition, the current is set to 1600 µA; the gain is set to 2; the electrolyte solution is set to ISOTON II; and a check is entered for the "post-measurement aperture tube flush".

In the "setting conversion from pulses to particle diameter" screen of the dedicated software, the bin interval is set to logarithmic particle diameter; the particle diameter bin is set to 256 particle diameter bins; and the particle diameter range is set to 2 µm to 60 µm.

The specific measurement procedure is as follows.

(1) 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) 30 mL of the aqueous electrolyte solution is introduced into a 100-mL flatbottom glass beaker, and to this is added as dispersing agent 0.3 mL of a dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.).

(3) An "Ultrasonic Dispersion System Tetora 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180°. 3.3 L of deionized water is introduced into the water tank of the ultrasound disperser and 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, 10 mg of the toner particle is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the dispersed toner particle-containing aqueous electrolyte solution prepared in (5) is dripped into the roundbottom beaker set in the sample stand as described in (1) with adjustment to provide a measurement concentration of 5%. Measurement is then performed until the number of measured particles reaches 50,000.

(7) The measurement data is analyzed by the dedicated software provided with the instrument and the weight-average particle diameter (D4) is calculated. When set to graph/volume % with the dedicated software, the "average diameter" on the "analysis/volumetric statistical value (arithmetic average)" screen is the weight-average particle diameter (D4).

EXAMPLES

The present disclosure is specifically described below using examples and comparative examples, but the present disclosure is not limited to or by these examples and comparative examples. Unless specifically indicated otherwise, the "parts" indicated in the examples and comparative examples is on a mass basis in all instances.

Polyester Resin Production Example terephthalic acid: 11.1 mol
2 mol propylene oxide adduct on bisphenol A: 10.8 mol These monomers were introduced into an autoclave together with an esterification catalyst, and the autoclave was fitted with a pressure reduction apparatus, a water separation apparatus, a nitrogen gas introduction apparatus, a temperature measurement apparatus, and a stirring apparatus. While reducing the pressure under a nitrogen atmosphere, a reaction was run at 220° C. by a common method until the Tg reached 70° C. to give a polyester resin. The weight-average molecular weight (Mw) was 8,200 and the number-average molecular weight (Mn) was 3,220.

Toner 1 Production Example

Preparation of Dispersion Stabilizer-Containing Aqueous Dispersion Medium for Supplemental Addition The following materials were introduced into 350 parts of deionized water in a reactor and were held for 60 minutes at a temperature of 60° C. while purging with $N_2$.

| | |
|---|---|
| sodium phosphate | 14.0 parts |
| 10% hydrochloric acid | 7.0 parts |

An aqueous calcium chloride solution of 8.0 parts of calcium chloride dissolved in 20 parts of deionized water was introduced all at once while stirring at 12,000 rpm using a T. K. Homomixer (Tokushu Kika Kogyo Co., Ltd.) to prepare a calcium phosphate-containing aqueous dispersion medium for supplemental addition.

Preparation of Aqueous Dispersion Medium for Granulation

The following materials were introduced into 1,000 parts of deionized water in a reactor and were held for 60 minutes at a temperature of 60° C. while purging with $N_2$.

| | |
|---|---|
| sodium phosphate | 14.0 parts |
| 10% hydrochloric acid | 7.0 parts |

An aqueous calcium chloride solution of 8.0 parts of calcium chloride dissolved in 20 parts of deionized water was introduced all at once while stirring at 12,000 rpm using a T. K. Homomixer (Tokushu Kika Kogyo Co., Ltd.) to prepare a calcium phosphate-containing aqueous dispersion medium for granulation.

A polymerizable monomer composition was then prepared using the following starting materials; this step is defined as the dissolution step.

| | |
|---|---|
| styrene | 75.0 parts |
| n-butyl acrylate | 25.0 parts |
| divinylbenzene | 0.1 parts |
| organosilicon compound (methyltriethoxysilane) | 15.0 parts |
| copper phthalocyanine pigment (Pigment Blue 15:3) | 6.5 parts |
| polyester resin | 6.0 parts |
| release agent (behenyl behenate) | 10.0 parts |

A polymerizable monomer composition was prepared by dispersing these starting materials for 3 hours using an attritor (Nippon Coke & Engineering Co., Ltd.). This polymerizable monomer composition was then transferred to a separate vessel and was held for 5 minutes at 63° C. while stirring. This was followed by the addition of 20.0 parts of the polymerization initiator t-butyl peroxypivalate (50% toluene solution) and holding for 5 minutes while stirring (dissolution step).

This polymerizable monomer composition was introduced into the aqueous dispersion medium for granulation and was granulated for 5 minutes while stirring with a high-speed stirrer. This was followed by the addition of 30 parts of the dispersion stabilizer-containing aqueous dispersion medium for supplemental addition and additional granulation for 15 minutes (granulation step). Stirring during granulation was carried out at 12,000 rpm, and the granulation temperature was 60° C.

The high-speed stirrer was changed over to a propeller stirring device and the internal temperature was raised to 70° C. The time required to raise the temperature was 10 minutes. A reaction was run for 5 hours while gently stirring. The pH was 5.1. Up to this point is defined as the reaction 1 step.

The pH was then adjusted to 8.0 within 10 minutes by adding a 1.0 mol/L aqueous NaOH solution and the temperature in the vessel was raised to 85° C. The time required to raise the temperature was 20 minutes. This was followed by holding for 3.0 hours at 85° C. within the vessel. Up to this point is defined as the reaction 2 step.

After the completion of the reaction 2 step, the reflux condenser was removed and a distillation apparatus capable of fraction recovery was installed. The temperature in the vessel was then raised to 100° C. The time required to raise the temperature was 30 minutes. This was followed by holding the temperature in the vessel at 100° C. for 5.0 hours. The pH when this was done was 8.0. From after the installation of the distillation apparatus capable of fraction recovery to the completion of the 5.0-hour holding period at 100° C. is defined as the distillation step. The holding temperature is designated the distillation temperature, and the holding time is designated the distillation time. Residual monomer and other solvent were removed during this step.

After the distillation step, cooling to 30° C. was carried out, dilute hydrochloric acid was added to the vessel to drop the pH to 1.5 and dissolve the dispersion stabilizer, and filtration was performed. The resulting cake was not removed after filtration, and washing was performed by the addition of 700 parts of deionized water and another filtration.

The cake was then removed after filtration and was vacuum dried for 1 hour at 30° C.

The coarse powder and the fine powder were cut using an air classifier. The thereby obtained particles were designated toner particle 1. Toner particle 1 as such was designated toner 1. The production conditions and formulation for toner particle 1 are given in Tables 1, 2-1 and 2-2, and the properties of toner 1 are given in Table 3.

Toners 2 to 6 and 8 to 22 Production Example

Toners 2 to 6 and 8 to 22 were produced according to the Toner 1 Production Example, but using the production conditions and formulations shown in Tables 1, 2-1 and 2-2. The properties of the resulting toners 2 to 6 and 8 to 22 are given in Table 3.

Toner 7 Production Example

Preparation of Dispersion Stabilizer-Containing Aqueous Dispersion Medium for Supplemental Addition The following materials were introduced into 350 parts of deionized water in a reactor and were held for 60 minutes at a temperature of 60° C. while purging with $N_2$.

| sodium hydroxide | 12.0 parts |
|---|---|
| 10% hydrochloric acid | 5.0 parts |

An aqueous magnesium chloride solution of 6.0 parts of magnesium chloride dissolved in 20 parts of deionized water was introduced all at once while stirring at 12,000 rpm using a T. K. Homomixer (Tokushu Kika Kogyo Co., Ltd.) to prepare a magnesium hydroxide-containing aqueous medium for supplemental addition, that contained dispersion-stabilizing inorganic fine particles.

Preparation of Aqueous Dispersion Medium for Granulation

The following materials were introduced into 1,000 parts of deionized water in a reactor and were held for 60 minutes at a temperature of 60° C. while purging with $N_2$.

| sodium hydroxide | 12.0 parts |
|---|---|
| 10% hydrochloric acid | 5.0 parts |

An aqueous magnesium chloride solution of 6.0 parts of magnesium chloride dissolved in 20 parts of deionized water was introduced all at once while stirring at 12,000 rpm using a T. K. Homomixer (Tokushu Kika Kogyo Co., Ltd.) to prepare a magnesium hydroxide-containing aqueous medium for granulation.

From the granulation step onward, toner 7 was produced according to the Toner 1 Production Example, but using the production conditions and formulation shown in Tables 1, 2-1 and 2-2. The properties of the resulting toner 7 are given in Table 3.

Toner 23 Production Example

Preparation of Binder Resin Fine Particle Dispersion 1

80.0 parts of styrene, 18.7 parts of butyl acrylate, and 1.3 parts of acrylic acid as a monomer for providing carboxy groups were mixed and dissolved. To this solution was added an aqueous solution of 4.0 parts of sodium dodecylbenzenesulfonate mixed in 150 parts of deionized water and dispersion was carried out. While slowly stirring for 10 minutes, an aqueous solution of 0.3 parts of potassium persulfate mixed in 10 parts of deionized water was also added. After substitution with nitrogen, an emulsion polymerization was run for 6 hours at 70° C. After the completion of polymerization, the reaction solution was cooled to room temperature and deionized water was added to obtain a binder resin fine particle dispersion 1 having a solids concentration of 20.0 mass % and a median diameter on a volume basis of 0.2 μm.

Preparation of Polyester Resin Particle Dispersion

A jacketed 3-liter reactor (BJ-30N, Tokyo Rika Kikai Co., Ltd.) equipped with a condenser, thermometer, device for the dropwise addition of water, and anchor stirring blade was held at 40° C. in a thermostatted water-circulation bath. A mixed solvent of 160.0 parts of ethyl acetate and 100.0 parts of isopropyl alcohol was introduced into this reactor; into this was introduced 300.0 parts of an amorphous polyester resin (condensate of terephthalic acid with propylene oxide-modified (2 mol adduct) bisphenol A, Mw=7,800, Tg=70° C., acid value=8.0 mg KOH/g); and an oil phase was obtained by dissolution with stirring at 150 rpm using a Three-One Motor. 14.0 parts of a 10.0 mass % aqueous ammonia solution was added dropwise over a dropwise addition time of 5 minutes to the stirred oil phase, mixing was carried out for 10 minutes, and 900.0 parts of deionized water was then added dropwise at a rate of 7.0 parts per minute to induce phase inversion and provide an emulsion.

800.0 parts of the obtained emulsion and 700.0 parts of deionized water were then introduced into a 2-liter recovery flask, and this was installed in an evaporator (Tokyo Rika Kikai Co., Ltd.) fitted with a vacuum control unit through the interposed trap sphere. While rotating the recovery flask, heating was carried out on a 60° C. hot-water bath and the pressure was reduced to 7 kPa to remove the solvent, while taking care to avoid bumping. Return to normal pressure was implemented when the amount of solvent recovery reached 1,100.0 parts; the recovery flask was water-cooled to obtain a dispersion. No solvent odor was detected from the resulting dispersion. The median diameter on a volume basis of the polyester resin fine particles in this dispersion was 130 nm. Deionized water was added to adjust the solids concentration to 20.0 mass %, and this was designated the polyester resin fine particle dispersion.

Preparation of Colorant Fine Particle Dispersion copper phthalocyanine pigment (Pigment Blue 15:3): 100.0 parts anionic surfactant, sodium dodecylbenzenesulfonate: 16.0 parts deionized water: 384.0 parts The preceding were mixed and dissolved, and dispersion was performed thereon for 60 minutes using an Ultimizer high-pressure impact-type disperser (HJP30006, Sugino Machine Limited) to produce a colorant fine particle dispersion in which the colorant was dispersed. The median diameter on a volume basis of the colorant fine particles in the colorant fine particle dispersion was 130 nm, and the colorant fine particle concentration was 20.0 mass %.

Preparation of Release Agent Fine Particle Dispersion

Fischer-Tropsch wax (melting point: 78° C.): 100.0 parts
anionic surfactant, sodium dodecylbenzenesulfonate 16.0 parts
deionized water: 384.0 parts The preceding components were mixed, and the release agent was dissolved at an internal temperature of 120° C. using a pressure ejection-type homogenizer (Gaulin homogenizer, Gaulin Co.). This was followed by a dispersion treatment for 120 minutes at a dispersion pressure of 5 MPa and then a dispersion treatment for 360 minutes at 40 MPa, after which cooling was carried out to obtain the release agent fine particle dispersion. The median diameter on a volume basis of the fine particles in this release agent fine particle dispersion was 225 nm. Deionized water was subsequently added to adjust the solids concentration to 20.0 mass %.

Preparation of Resin Particle 1 binder resin fine particle dispersion 1: 500.0 parts
polyester resin fine particle dispersion: 25.0 parts
colorant fine particle dispersion: 40.0 parts
release agent fine particle dispersion: 25.0 parts
deionized water: 325.0 parts
anionic surfactant, sodium dodecylbenzenesulfonate: 10.0 parts These components were introduced into a 3-liter reactor fitted with a thermometer, pH meter, and stirrer, and the pH was brought to 3.0 at a temperature of 25° C. by the addition of 0.3 mol/L nitric acid. Then, while dispersing at 5,000 rpm with a homogenizer (Ultra-Turrax T50, IKA Japan KK), 130.0 parts of an aqueous aluminum chloride solution (0.3 mass %) was added and dispersion was carried out for 6 minutes.

The reactor was then fitted with a stirrer and mantle heater, and the stirrer rotation rate was adjusted so the slurry was thoroughly stirred. While continuing to stir, the temperature was raised to a temperature of 40° C. at a ramp rate of 0.2° C./minute, and then, after passing 40° C., was raised to 90° C. at a ramp rate of 0.05° C./minute, and a heat treatment step was run for 180 minutes at 90° C. This was followed by cooling the vessel to 20° C. using cooling water.

After cooling, the slurry was passed through a nylon mesh having an aperture of 15 μm to remove the coarse powder; nitric acid was added to the resin particle dispersion that had passed through the mesh, to adjust the pH to 6.0; and vacuum filtration with an aspirator was then carried out. The resin particles remaining on the filter paper were finely broken up manually as much as possible and were then introduced into 10-fold deionized water, with respect to the amount of the toner, at a temperature of 30° C. After stirring and mixing for 30 minutes, vacuum filtration with an aspirator was carried out again and the conductivity of the filtrate was measured. The resin particle 1 was washed by repeating this process until the conductivity of the filtrate reached not more than 5 μS/cm.

The washed resin particles were finely broken up using a wet/dry sizing mill, followed by vacuum drying for 36 hours in a 35° C. oven to obtain resin particles.

Resin Particle Dispersion 400.0 parts of deionized water was introduced into a reactor. To this were added a surfactant (sodium dodecylbenzenesulfonate) and a metal salt (aluminum chloride hexahydrate) so as to provide a surfactant concentration of 1.0×100 mass % and a metal ion concentration of 40.0 mmol/L. To this was added 100.0 parts of the resin particles, and dispersion was performed at a temperature of 25° C. for 6 minutes at 5,000 rpm using a homogenizer (Ultra-Turrax T50, IKA Japan KK). A 1.0 N aqueous sodium hydroxide solution was then used to adjust the pH to 9.0 and yield a resin particle dispersion.

100.0 parts of the resin particle dispersion was then metered into a reactor and the temperature was raised to 70° C. while stirring. To this was added a hydrolysis solution of 18.0 parts of hexyltriethoxysilane, adjusted to pH 9.0 using a 1 mol/L aqueous NaOH solution, and stirring was performed for 240 minutes to carry out a condensation step.

This was followed by filtration using Kiriyama filter paper (No. 5C, pore diameter=1 μm) to separate the particles from the filtrate. The obtained particles were additionally washed with 100 parts of deionized water and were vacuum dried for 24 hours at 25° C. to obtain toner particle 23. Toner particle 23 was used as such as toner 23. The properties of the obtained toner 23 are given in Table 3.

Toner 24 Production Example

Preparation of Binder Resin Particle Dispersion 2

89.5 parts of styrene, 9.2 parts of butyl acrylate, 1.3 parts of acrylic acid as a monomer for providing carboxy groups, and 3.2 parts of n-lauryl mercaptan were mixed and dissolved. To this solution was added an aqueous solution of 1.5 parts of Neogen RK (Dai-ichi Kogyo Seiyaku Co., Ltd.) in 150 parts of deionized water and dispersion was carried out. While slowly stirring for 10 minutes, an aqueous solution of 0.3 parts of potassium persulfate in 10 parts of deionized water was also added. After substitution with nitrogen, an emulsion polymerization was run for 6 hours at 70° C. After the completion of polymerization, the reaction solution was cooled to room temperature and deionized water was added to obtain a binder resin particle dispersion 2 having a solids concentration of 12.5 mass % and a median diameter on a volume basis of 0.2 μm. The resin contained in the binder resin particle dispersion 2 contained carboxy groups originating from the acrylic acid.

Preparation of Release Agent Dispersion 100 parts of a release agent (behenyl behenate, melting point: 72.1° C.) and 15 parts of Neogen RK were mixed in 385 parts of deionized water and a release agent dispersion was obtained by dispersing for approximately 1 hour using a JN100 wet jet mill (JOKOH Co., Ltd.). The release agent dispersion had a concentration of 20 mass %.

Preparation of Colorant Dispersion

A colorant dispersion was obtained by mixing 100 parts of copper phthalocyanine pigment (Pigment Blue 15:3) as colorant and 15 parts of Neogen RK into 885 parts of deionized water and dispersing for approximately 1 hour using a JN100 wet jet mill.

265 parts of the binder resin particle dispersion 2, 10 parts of the release agent dispersion, and 10 parts of the colorant dispersion were then dispersed using a homogenizer (Ultra-Turrax T50, IKA). While stirring, the temperature in the vessel was adjusted to 30° C. and the pH was adjusted to 8.0 by the addition of a 1 mol/L aqueous sodium hydroxide solution (pH adjustment 1). An aqueous solution of 0.3 parts of calcium chloride dissolved in 10 parts of deionized water was added as aggregating agent over 10 minutes while stirring at 30° C. Heating was begun after standing for 3 minutes and the temperature was raised to 50° C. to carry out the production of aggregate particles. While in this condition, the particle diameter of the aggregate particles was measured using a "Coulter Counter Multisizer 3" (registered trademark, Beckman Coulter, Inc.). When the weight-average particle diameter reached 6.5 μm, 0.9 parts of sodium chloride and 5.0 parts of Neogen RK were added to stop particle growth.

To this was added 1.0 parts of calcium chloride as a supplemental addition of metal compound, followed by the addition of 14.0 parts of the organosilicon compound hexyltriethoxysilane, adjustment to pH=9.0 by the addition of a 1 mol/L aqueous sodium hydroxide solution (pH adjustment 2), and then heating to 95° C. Fusion of the aggregated particles and spheronizing were carried out while maintaining stirring at 95° C. and carrying out the hydrolysis and condensation of the organosilicon compound. Cooling was started when the average circularity reached 0.980; after cooling to 85° C., adjustment to pH=9.5 (pH adjustment 3) was performed by the addition of a 1 mol/L aqueous sodium hydroxide solution; stirring was carried out for 180 minutes to further develop condensation; and cooling was subsequently carried out to obtain a toner particle dispersion.

A toner cake was obtained by adding hydrochloric acid to the obtained toner particle dispersion to adjust the pH to not more than 1.5, holding for 1 hour while stirring, and then subjecting the toner particle dispersion to solid-liquid separation on a pressure filter. This was made into a dispersion again by reslurrying with deionized water, and solid-liquid separation on the aforementioned filter was then performed. Reslurrying and solid-liquid separation were repeated until the conductivity of the filtrate reached not more than 5.0 S/cm, after which a final solid-liquid separation was performed to obtain a toner cake. The obtained toner cake was dried in a Flash Jet Dryer air current dryer (Seishin Enterprise Co., Ltd.). The drying conditions were an injection temperature of 90° C. and a dryer outlet temperature of 40° C., and the toner cake feed rate was adjusted in correspondence to the water content of the toner cake to a rate such that the outlet temperature did not deviate from 40° C. The fines and coarse particles were cut using a Coanda effect-based multi-grade classifier to yield a toner particle 24. Toner particle 24 was used as such as toner 24. The properties of the obtained toner 24 are given in Table 3.

TABLE 1

|  | Organosilicon compound | | Reaction 1 step | | | Reaction 2 step | | | Distillation step | | |
|---|---|---|---|---|---|---|---|---|---|---|---|
|  | name | amount (parts) | temp. (° C.) | time (hr) | pH | temp. (° C.) | time (hr) | pH | temp. (° C.) | time (hr) | pH |
| Toner 1 | methyltriethoxysilane | 15.0 | 70 | 5 | 5.1 | 85 | 3.0 | 8.0 | 100 | 5.0 | 8.0 |
| Toner 2 | ethyltriethoxysilane | 15.0 | 70 | 5 | 5.1 | 85 | 3.0 | 8.0 | 100 | 5.0 | 8.0 |
| Toner 3 | butyltriethoxysilane | 15.0 | 70 | 5 | 5.1 | 85 | 3.0 | 8.0 | 100 | 5.0 | 8.0 |
| Toner 4 | hexyltriethoxysilane | 15.0 | 70 | 5 | 5.1 | 85 | 3.0 | 8.0 | 100 | 5.0 | 8.0 |
| Toner 5 | phenyltriethoxysilane | 15.0 | 70 | 5 | 5.1 | 85 | 3.0 | 8.0 | 100 | 5.0 | 8.0 |
| Toner 6 | ethyltriethoxysilane | 15.0 | 70 | 5 | 5.1 | 75 | 5.0 | 8.0 | 75 | 8.0 | 8.0 |
| Toner 7 | methyltriethoxysilane | 15.0 | 70 | 5 | 5.1 | 85 | 3.0 | 8.0 | 100 | 5.0 | 8.0 |
| Toner 8 | methyltriethoxysilane | 18.0 | 70 | 5 | 5.1 | 85 | 3.0 | 8.0 | 100 | 5.0 | 8.0 |
| Toner 9 | methyltriethoxysilane | 24.0 | 70 | 5 | 5.1 | 85 | 3.0 | 8.0 | 100 | 5.0 | 8.0 |
| Toner 10 | methyltriethoxysilane | 3.0 | 70 | 5 | 5.1 | 85 | 3.0 | 8.0 | 100 | 5.0 | 8.0 |
| Toner 11 | methyltriethoxysilane | 15.0 | 70 | 5 | 5.1 | 85 | 3.0 | 8.0 | 100 | 5.0 | 8.0 |
| Toner 12 | methyltriethoxysilane | 15.0 | 70 | 5 | 5.1 | 85 | 3.0 | 8.0 | 100 | 5.0 | 8.0 |
| Toner 13 | methyltriethoxysilane | 15.0 | 70 | 5 | 5.1 | 85 | 3.0 | 8.0 | 100 | 5.0 | 8.0 |
| Toner 14 | methyltriethoxysilane | 15.0 | 70 | 5 | 5.1 | 85 | 3.0 | 8.0 | 100 | 5.0 | 8.0 |
| Toner 15 | methyltriethoxysilane | 15.0 | 70 | 5 | 5.1 | 85 | 3.0 | 8.0 | 100 | 5.0 | 8.0 |
| Toner 16 | methyltriethoxysilane | 15.0 | 70 | 5 | 5.1 | 85 | 3.0 | 8.0 | 100 | 5.0 | 8.0 |
| Toner 17 | methyltriethoxysilane | 24.0 | 70 | 5 | 5.1 | 85 | 3.0 | 8.0 | 100 | 5.0 | 8.0 |
| Toner 18 | methyltriethoxysilane | 26.0 | 70 | 5 | 5.1 | 85 | 3.0 | 8.0 | 100 | 5.0 | 8.0 |
| Toner 19 | hexyltriethoxysilane | 6.5 | 70 | 5 | 5.1 | 70 | 3.0 | 7.0 | 70 | 5.0 | 7.0 |
| Toner 20 | hexyltriethoxysilane | 2.0 | 70 | 5 | 5.1 | 85 | 3.0 | 8.0 | 100 | 5.0 | 8.0 |
| Toner 21 | hexyltriethoxysilane | 36.0 | 70 | 5 | 5.1 | 85 | 3.0 | 8.0 | 100 | 5.0 | 8.0 |
| Toner 22 | hexyltriethoxysilane | 6.5 | 70 | 5 | 5.1 | 85 | 3.0 | 8.0 | 100 | 5.0 | 8.0 |
| Toner 23 | hexyltriethoxysilane | 18.0 | described in Specification | | | | | | | | |
| Toner 24 | hexyltriethoxysilane | 14.0 | described in Specification | | | | | | | | |

TABLE 2-1

| | Production conditions for aqueous dispersion medium for supplemental addition | | | | Production conditions for aqueous dispersion medium for granulation | | | |
|---|---|---|---|---|---|---|---|---|
| | compounds used to produce dispersing agent | | temp. (° C.) | stirring rotation rate (rpm) | compounds used to produce dispersing agent | | temp. (° C.) | stirring rotation rate (rpm) |
| Toner 1 | sodium phosphate | calcium chloride | 60 | 12,000 | sodium phosphate | calcium chloride | 60 | 12,000 |
| Toner 2 | sodium phosphate | calcium chloride | 60 | 12,000 | sodium phosphate | calcium chloride | 60 | 12,000 |
| Toner 3 | sodium phosphate | calcium chloride | 60 | 12,000 | sodium phosphate | calcium chloride | 60 | 12,000 |
| Toner 4 | sodium phosphate | calcium chloride | 60 | 12,000 | sodium phosphate | calcium chloride | 60 | 12,000 |
| Toner 5 | sodium phosphate | calcium chloride | 60 | 12,000 | sodium phosphate | calcium chloride | 60 | 12,000 |
| Toner 6 | sodium phosphate | calcium chloride | 60 | 12,000 | sodium phosphate | calcium chloride | 60 | 12,000 |
| Toner 7 | sodium hydroxide | magnesium chloride | 60 | 12,000 | sodium hyiroxide | magnesium chloride | 60 | 12,000 |
| Toner 8 | sodium phosphate | calcium chloride | 65 | 10,000 | sodium phosphate | calcium chloride | 65 | 10,000 |
| Toner 9 | sodium phosphate | calcium chloride | 65 | 10,000 | sodium phosphate | calcium chloride | 65 | 10,000 |
| Toner 10 | sodium phosphate | calcium chloride | 60 | 12,000 | sodium phosphate | calcium chloride | 60 | 12,000 |
| Toner 11 | sodium phosphate | calcium chloride | 60 | 12,000 | sodium phosphate | calcium chloride | 60 | 12,000 |
| Toner 12 | sodium phosphate | calcium chloride | 50 | 13,500 | sodium phosphate | calcium chloride | 50 | 13,500 |
| Toner 13 | sodium phosphate | calcium chloride | 70 | 10,000 | sodium phosphate | calcium chloride | 70 | 10,000 |
| Toner 14 | sodium phosphate | calcium chloride | 45 | 15,000 | sodium phosphate | calcium chloride | 45 | 15,000 |
| Toner 15 | sodium phosphate | calcium chloride | 70 | 7,500 | sodium phosphate | calcium chloride | 70 | 7,500 |
| Toner 16 | sodium phosphate | calcium chloride | 60 | 12,000 | sodium phosphate | calcium chloride | 60 | 12,000 |
| Toner 17 | sodium phosphate | calcium chloride | 50 | 13,500 | sodium phosphate | calcium chloride | 50 | 13,500 |
| Toner 18 | sodium phosphate | calcium chloride | 50 | 13,500 | sodium phosphate | calcium chloride | 50 | 13,500 |
| Toner 19 | sodium phosphate | calcium chloride | 60 | 12,000 | sodium phosphate | calcium chloride | 60 | 12,000 |

TABLE 2-1-continued

| | Production conditions for aqueous dispersion medium for supplemental addition | | | | Production conditions for aqueous dispersion medium for granulation | | | |
|---|---|---|---|---|---|---|---|---|
| | compounds used to produce dispersing agent | | temp. (° C.) | stirring rotation rate (rpm) | compounds used to produce dispersing agent | | temp. (° C.) | stirring rotation rate (rpm) |
| Toner 20 | sodium phosphate | calcium chloride | 60 | 12,000 | sodium phosphate | calcium chloride | 60 | 12,000 |
| Toner 21 | sodium phosphate | calcium chloride | 60 | 12,000 | sodium phosphate | calcium chloride | 60 | 12,000 |
| Toner 22 | sodium phosphate | calcium chloride | 60 | 12,000 | sodium phosphate | calcium chloride | 60 | 12,000 |
| Toner 23 | | | | | described in Specification | | | |
| Toner 24 | | | | | described in Specification | | | |

TABLE 2-2

| | Granulation step | | | | |
|---|---|---|---|---|---|
| | granulation time prior to supplemental addition (min) | granulation time after supplemental addition (min) | stirring rotation rate (rpm) | amount of supplemental addition (parts) | temp. (° C.) |
| Toner 1 | 5 | 15 | 12,000 | 30 | 60 |
| Toner 2 | 5 | 15 | 12,000 | 30 | 60 |
| Toner 3 | 5 | 15 | 12,000 | 30 | 60 |
| Toner 4 | 5 | 15 | 12,000 | 30 | 60 |
| Toner 5 | 5 | 15 | 12,000 | 30 | 60 |
| Toner 6 | 5 | 15 | 12,000 | 30 | 60 |
| Toner 7 | 5 | 15 | 12,000 | 30 | 60 |
| Toner 8 | 5 | 15 | 12,000 | 30 | 60 |
| Toner 9 | 5 | 15 | 12,000 | 30 | 60 |
| Toner 10 | 5 | 15 | 12,000 | 30 | 60 |
| Toner 11 | 5 | 10 | 12,000 | 15 | 60 |
| Toner 12 | 5 | 15 | 12,000 | 30 | 60 |
| Toner 13 | 5 | 15 | 12,000 | 30 | 60 |
| Toner 14 | 5 | 15 | 12,000 | 30 | 60 |
| Toner 15 | 5 | 15 | 12,000 | 30 | 60 |
| Toner 16 | 5 | 15 | 10,000 | 30 | 60 |
| Toner 17 | 5 | 15 | 12,000 | 30 | 60 |
| Toner 18 | 5 | 15 | 12,000 | 30 | 60 |
| Toner 19 | 5 | 15 | 12,000 | 30 | 60 |
| Toner 20 | 5 | 15 | 12,000 | 30 | 60 |
| Toner 21 | 5 | 15 | 12,000 | 30 | 60 |
| Toner 22 | 5 | 15 | 12,000 | 0 | 60 |
| Toner 23 | | | described in Specification | | |
| Toner 24 | | | described in Specification | | |

TABLE 3

| | Toner particle D4 (μm) | *1 (%) | Dav. (nm) | *2 (%) | Number of inorganic fine particles | *3 (%) | Dm (nm) | *4 (%) | *5 (%) | Dav./Dm |
|---|---|---|---|---|---|---|---|---|---|---|
| Toner 1 | 6.0 | 70.1 | 22.5 | 5.0 | 20 | 1 | 112.5 | 98 | 95 | 0.20 |
| Toner 2 | 6.0 | 65.2 | 21.1 | 5.0 | 19 | 1 | 111.2 | 97 | 95 | 0.19 |
| Toner 3 | 6.1 | 52.3 | 20.5 | 5.0 | 19 | 2 | 116.5 | 98 | 96 | 0.18 |
| Toner 4 | 6.2 | 40.1 | 18.9 | 5.0 | 20 | 1 | 99.9 | 97 | 97 | 0.19 |
| Toner 5 | 6.2 | 25.6 | 19.2 | 5.0 | 21 | 0 | 108.6 | 97 | 98 | 0.18 |
| Toner 6 | 6.1 | 6.5 | 19.8 | 5.0 | 20 | 1 | 112.5 | 98 | 98 | 0.18 |
| Toner 7 | 6.0 | 70.1 | 22.5 | 5.0 | 20 | 1 | 112.5 | 98 | 95 | 0.20 |
| Toner 8 | 6.1 | 68.2 | 50.0 | 2.5 | 20 | 1 | 198.5 | 98 | 95 | 0.25 |
| Toner 9 | 6.2 | 65.8 | 95.0 | 1.0 | 21 | 2 | 200.5 | 98 | 96 | 0.47 |
| Toner 10 | 6.1 | 67.8 | 6.0 | 15.0 | 20 | 1 | 114.5 | 98 | 96 | 0.04 |
| Toner 11 | 6.1 | 70.5 | 21.5 | 5.0 | 17 | 1 | 115.5 | 93 | 89 | 0.19 |
| Toner 12 | 6.1 | 70.4 | 21.2 | 5.0 | 21 | 1 | 58.5 | 97 | 98 | 0.36 |
| Toner 13 | 6.0 | 70.3 | 22.6 | 5.0 | 19 | 1 | 785.6 | 98 | 95 | 0.03 |
| Toner 14 | 6.2 | 69.9 | 22.0 | 5.0 | 20 | 1 | 40.8 | 98 | 96 | 0.54 |
| Toner 15 | 6.0 | 69.8 | 22.4 | 5.0 | 21 | 2 | 888.6 | 97 | 96 | 0.03 |
| Toner 16 | 6.1 | 70.3 | 22.3 | 5.0 | 20 | 1 | 111.1 | 86 | 95 | 0.20 |
| Toner 17 | 6.2 | 70.4 | 50.8 | 5.0 | 20 | 2 | 58.6 | 98 | 97 | 0.87 |
| Toner 18 | 6.2 | 69.7 | 60.1 | 4.0 | 21 | 1 | 56.7 | 97 | 96 | 1.06 |
| Toner 19 | 6.1 | 4.1 | 5.8 | 8.0 | 20 | 2 | 112.5 | 98 | 95 | 0.05 |
| Toner 20 | 6.2 | 40.1 | 2.2 | 30.4 | 20 | 3 | 113.2 | 98 | 96 | 0.02 |
| Toner 21 | 6.2 | 40.3 | 150.5 | 1.5 | 20 | 1 | 115.4 | 97 | 95 | 1.30 |

TABLE 3-continued

|  | Toner particle D4 (μm) | *1 (%) | Dav. (nm) | *2 (%) | Number of inorganic fine particles | *3 (%) | Dm (nm) | *4 (%) | *5 (%) | Dav./Dm |
|---|---|---|---|---|---|---|---|---|---|---|
| Toner 22 | 6.1 | 39.7 | 6.0 | 8.0 | 10 | 2 | 113.4 | 80 | 96 | 0.05 |
| Toner 23 | 6.2 | 40.2 | 50.0 | 1.5 | 50 | 98 | 114.5 | 98 | 99 | 0.44 |
| Toner 24 | 6.1 | 40.1 | 50.0 | 1.5 | 5 | 98 | 50.0 | 70 | 10 | 1.00 |

*1: the proportion of the peak area assigned to the structure with formula (T3), relative to the total peak area for the organosilicon polymer
*2: the proportion of Arn line segments for which FRAn is not more than 5.0 nm
*3: the proportion of toner particles having at least one inorganic fine particle in contact with the core particle and not in contact with the surface layer
*4: the proportion of toner particles for which at least one inorganic fine particle is present in each of eight equally divided regions of the surface layer
*5: the proportion of toner particles for which the number of inorganic fine particles present in contact with the core particle in the surface layer is from 16 to 30

Examples 1 to 18 and Comparative Examples 1 to 6

The following evaluations were performed on toners 1 to 24. The results of the evaluation of toners 1 to 24 are given in Table 4.

Evaluation of Developing Roller Filming

The method for evaluating developing roller filming and the evaluation criteria are specifically described in the following.

A modified version of an HP Color Laser Jet Enterprise CP4525dn (Hewlett-Packard), a tandem laser beam printer having a structure as in FIG. 1, and a modified cartridge were used for the image-forming apparatus.

This modified version was modified by changing the internal gearing to provide a process speed of 320 mm/sec. In addition, the product toner was removed from the cartridge interior, cleaning was done with an air blower, and 250 g of the toner was loaded. This toner cartridge was held for 24 hours in the environment in which the evaluation would be carried out and was then installed in the cyan station of the printer; the image output tests were run with dummy cartridges installed at the other stations.

50,000 prints were output of a halftone image having a toner laid-on level of 0.3 mg/cm², by repeating a process in which a one minute pause was implemented every two prints, and image evaluation was performed using the following method.

Criteria for Evaluation of Developing Roller Filming

Developing roller filming was evaluated by visual inspection of the surface of the developing roller and by evaluation of the image.

After the 25,000th print and the 50,000th print, a visual evaluation was performed as to whether shading non-uniformity had been produced in the 1% printed image area and the nonprinted image area of the printed halftone image. The toner on the surface of the developing roller was then blown with air and the surface of the developing roller was observed.

A: Shading non-uniformity has not been produced in the image and filming of the developing roller surface is also not present.

B: Shading non-uniformity has not been produced in the image, but some filming at the developing roller surface is seen.

C: Filming at the developing roller surface is seen and a slight degree of shading non-uniformity has been produced in the image.

D: Filming at the developing roller surface is seen and significant shading non-uniformity has been produced in the image.

Evaluation of the Fogging

To evaluate the fogging, the same image output test as in the evaluation of developing roller filming was run in a 30.0° C./humidity 80.0% RH environment and an evaluation was performed using the following method.

Criteria for Evaluation of the Fogging

After 25,000 prints and 50,000 prints had been output, the modified machine and modified cartridge were held for three days in a 30.0° C./80.0% RH environment. After the holding period, an image having a white background region was output, and image fogging was evaluated by calculating the fogging density (%) using the difference between the whiteness of the paper used for the evaluation and the whiteness of the white background region of the output image, as measured using a "Reflectometer Model TC-6DS" (Tokyo Denshoku Co., Ltd.). The fogging density was determined by rounding the second decimal position. A green light filter was used for the filter.

A: the fogging density is not more than 0.5%

B: the fogging density is at least 0.6% and not more than 1.5%

C: the fogging density is at least 1.6% and not more than 2.5%

D: the fogging density is at least 2.6%

Evaluation of the Fixing Performance

Operating in a normal-temperature, normal-humidity (25° C./50% RH) environment using the modified machine and modified cartridge as described above, a solid image (toner laid-on level: 0.40 mg/cm²) was formed with the fixation temperature being changed in 5° C. steps. Plain paper (letter size XEROX 4200 paper, Xerox Corporation, 75 g/m²) was used as the transfer material.

The fixed image was rubbed 10 times under a load of 75 g/cm² using Kimwipes (S-200, Crecia Co. Ltd.), and the low-temperature fixability was evaluated based on the temperature at which the percentage decline in the density pre-versus-post-rubbing become less than 5% and the temperature at which it became less than 10%. The image density was measured using a reflection densitometer (product name: RD918, MacBeth Corporation).

Evaluation Criteria

A: not more than 140° C.

B: 145° C.

C: 150° C.

D: at least 155° C.

TABLE 4

|  |  | Developing roller filming | | Fogging | | | | Fixing performance | |
|---|---|---|---|---|---|---|---|---|---|
|  |  | 25,000 prints | 50,000 prints | 25,000 prints | (%) | 50,000 prints | (%) | less than 5% | less than 10% |
| Example 1 | toner 1 | A | A | A | 0.2 | A | 0.3 | A | A |
| Example 2 | toner 2 | A | A | A | 0.2 | A | 0.3 | A | A |
| Example 3 | toner 3 | A | A | A | 0.3 | A | 0.4 | A | A |
| Example 4 | toner 4 | A | A | A | 0.4 | A | 0.5 | A | A |
| Example 5 | toner 5 | A | B | A | 0.5 | B | 0.8 | A | A |
| Example 6 | toner 6 | A | C | A | 0.5 | C | 1.6 | A | A |
| Example 7 | toner 7 | A | A | A | 0.2 | A | 0.3 | A | A |
| Example 8 | toner 8 | A | A | A | 0.2 | A | 0.3 | B | A |
| Example 9 | toner 9 | A | A | A | 0.1 | A | 0.2 | C | A |
| Example 10 | toner 10 | A | C | A | 0.5 | C | 1.7 | A | A |
| Example 11 | toner 11 | A | A | A | 0.2 | A | 0.3 | C | A |
| Example 12 | toner 12 | A | A | A | 0.2 | A | 0.3 | B | A |
| Example 13 | toner 13 | A | B | A | 0.5 | B | 1.2 | A | A |
| Example 14 | toner 14 | A | A | A | 0.2 | A | 0.3 | C | C |
| Example 15 | toner 15 | C | C | C | 1.6 | C | 2.1 | A | A |
| Example 16 | toner 16 | A | A | A | 0.2 | A | 0.3 | C | C |
| Example 17 | toner 17 | A | A | A | 0.2 | A | 0.3 | C | A |
| Example 18 | toner 18 | A | A | A | 0.2 | A | 0.3 | C | C |
| Comparative Example 1 | toner 19 | C | D | C | 1.8 | D | 2.8 | A | A |
| Comparative Example 2 | toner 20 | C | D | C | 1.9 | D | 2.9 | A | A |
| Comparative Example 3 | toner 21 | A | A | A | 0.4 | A | 0.5 | D | D |
| Comparative Example 4 | toner 22 | B | C | B | 1.3 | C | 2.4 | D | D |
| Comparative Example 5 | toner 23 | C | D | C | 2.1 | D | 3.2 | D | D |
| Comparative Example 6 | toner 24 | A | B | A | 0.5 | C | 1.8 | D | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-095423, filed Jun. 1, 2020 which is hereby incorporated by reference herein in its entirety.

What is claimed is:

1. A toner, comprising:
a toner particle that comprises a core particle comprising a binder resin, the toner particle having a surface layer comprising inorganic fine particles and an organosilicon polymer;
the organosilicon polymer having a structure given by formula (T3)

$$R\text{—}Si(O_{1/2})_3 \quad (T3)$$

where R represents an alkyl group having 1 to 6 carbons or a phenyl group; and
a proportion of a peak area assigned to the structure given by formula (T3) relative to a total peak area for the organosilicon polymer is at least 5.0% in $^{29}$Si-NMR measurement of tetrahydrofuran insoluble-matter of the toner particle, wherein
in observation of a cross section of the toner particle using a transmission electron microscope,
with a long axis L being a chord that passes through the geometric center of the toner particle and provides the longest diameter in the toner particle cross section, with a line segment a being one of line segments provided by dividing the long axis L at a midpoint thereof,
with Arn (n=1 to 32) respectively being 32 line segments provided using the line segment a as a point of reference, by drawing a line segment from the midpoint of the long axis L to a surface of the toner particle, each line segment being shifted by 11.25°,
with RAn (n=1 to 32) being a length of each of the line segments, and
with FRAn (n=1 to 32) being a thickness of the surface layer on the Arn (n=1 to 32),
in a cross section of a toner particle for which Dtem is in a range of a toner particle weight-average particle diameter±10%,
(i) an average thickness Dav. of the surface layer is 5.0 to 100.0 nm,
(ii) the proportion of Arn line segments, for which the FRAn is not more than 5.0 nm, is not more than 20.0%,
(iii) the number of inorganic fine particles in the surface layer contacting the core particle is 16 to 30 per toner particle, and
(iv) in 100 toner particles, for which the Dtem is in a range of the toner particle weight-average particle diameter+10%, the proportion of toner particles comprising at least one inorganic fine particle present in the core particle and not in contact with the surface layer is not more than 10%
where Dtem=(RA1+RA2+RA3+RA4+RA5+RA6+RA7+RA8+RA9+RA10+RA11+RA12+RA13+RA14+RA15+RA16+RA17+RA18+RA19+RA20+RA21+RA22+RA23+RA24+RA25+RA26+RA27+RA28+RA29+RA30+RA31+RA32)/16.

2. The toner according to claim 1, wherein the inorganic fine particles comprise at least one member selected from the group consisting of the element calcium and the element magnesium.

3. The toner according to claim 1, wherein primary particles of the inorganic fine particles have a number-average particle diameter of 50.0 to 800.0 nm.

4. The toner according to claim 1, wherein[,]] in the observation of a toner particle cross section using a transmission electron microscopy, a proportion of toner particles for which at least one of the inorganic fine particles is present in each of a region of the surface layer surrounded sandwiched by Ar1 and Ar5, a region of the surface layer surrounded by Ar5 and Ar9, a region of the surface layer surrounded by Ar9 and Ar13, a region of the surface layer surrounded by Ar13 and Ar17, a region of the surface layer surrounded by Ar17 and Ar21, a region of the surface layer surrounded by Ar21 and Ar25, a region of the surface layer surrounded by Ar25 and Ar29, and a region of the surface layer surrounded by Ar29 and Ar1, is at least 90% of 100 toner particles for which the Dtem is in a range of the toner particle weight-average particle diameter±10%.

5. The toner according to claim 1, wherein in the observation of a toner particle cross section using a transmission electron microscopy, a proportion of toner particles in which 16 to 30 inorganic fine particles in the surface layer contact the core particle is at least 90% of 100 toner particles for which the Dtem is in a range of the toner particle weight-average particle diameter±10%.

6. The toner according to claim 1, wherein Dav./Dm<1.00 when Dm is a primary particle diameter of the inorganic fine particles.

* * * * *